United States Patent
McGurk et al.

(10) Patent No.: US 12,502,246 B2
(45) Date of Patent: Dec. 23, 2025

(54) COMPRESSION/NEUTRAL DRILL GUIDE SLEEVE

(71) Applicant: DEPUY SYNTHES PRODUCTS, INC., Raynham, MA (US)

(72) Inventors: Michael McGurk, Williamstown, NJ (US); Philip Watt, New Holland, PA (US); Todd J. Kent, Philadelphia, PA (US); Jason Long, Wallingford, PA (US); William Woodburn, Mickleton, NJ (US); John V. Hunt, Cincinnati, OH (US); Junior Julien, Phoenixville, PA (US); Joshua McManus, West Chester, PA (US)

(73) Assignee: DEPUY SYNTHES PRODUCTS, INC., Raynham, MA (US)

( * ) Notice: Subject to any disclaimer, the term of this patent is extended or adjusted under 35 U.S.C. 154(b) by 454 days.

(21) Appl. No.: 18/052,480

(22) Filed: Nov. 3, 2022

(65) Prior Publication Data
US 2023/0285116 A1    Sep. 14, 2023

Related U.S. Application Data

(60) Provisional application No. 63/371,051, filed on Aug. 10, 2022, provisional application No. 63/285,264, filed on Dec. 2, 2021.

(51) Int. Cl.
*A61C 1/08* (2006.01)
*A61B 17/00* (2006.01)
(Continued)

(52) U.S. Cl.
CPC ........ *A61C 1/082* (2013.01); *A61B 17/00234* (2013.01); *A61B 17/846* (2013.01); *A61B 17/1637* (2013.01)

(58) Field of Classification Search
CPC . A61C 1/082; A61B 17/00234; A61B 17/846; A61B 17/1637
See application file for complete search history.

(56) References Cited

U.S. PATENT DOCUMENTS 5,507,801 A * 4/1996 Gisin ................... B25H 1/0078
606/86 R
5,667,513 A * 9/1997 Torrie ................ A61B 17/0401
81/3.4

(Continued)

FOREIGN PATENT DOCUMENTS

WO    2007092441 A2    8/2007

OTHER PUBLICATIONS

International Search Report and Written Opinion for PCT/IB2022/060790 mailed on Apr. 11, 2023.

(Continued)

*Primary Examiner* — Kevin T Truong
*Assistant Examiner* — Diana Jones
(74) *Attorney, Agent, or Firm* — Kramer & Amado, P.C.

(57) ABSTRACT

A drill guide assembly configured to engage a drill bit, including: a drill guide including: a drill guide tube including a ring and a flared end at a proximal end of the drill guide tube; a drill guide body with a central opening configured to receive the drill guide tube and a tube stop configured to engage the flared end; and a spring configured to engage the ring and distal end of the drill guide body; and a drill guide sleeve with a central opening configured to receive the drill guide including a ring stop configured to engage the ring and a sleeve distal end configured to engage a plate hole on a bone plate, wherein the spring is configured to bias the drill guide tube in a distal direction so that a distal end of the drill guide tube extends from the sleeve distal end.

21 Claims, 20 Drawing Sheets

(51) Int. Cl.
*A61B 17/16* (2006.01)
*A61B 17/84* (2006.01)

(56) References Cited

U.S. PATENT DOCUMENTS

| | | | |
|---|---|---|---|
| 6,524,238 B2 * | 2/2003 | Velikaris | A61B 17/02 |
| | | | 16/422 |
| 7,011,665 B2 | 3/2006 | Null | |
| 7,081,119 B2 | 7/2006 | Stihl | |
| 7,163,542 B2 | 1/2007 | Ryan | |
| 7,357,804 B2 * | 4/2008 | Binder, Jr. | A61B 17/1728 |
| | | | 606/96 |
| 7,488,327 B2 | 2/2009 | Rathbun | |
| 7,731,721 B2 * | 6/2010 | Rathbun | A61B 17/1728 |
| | | | 606/88 |
| 8,496,665 B2 | 7/2013 | Cavallazzi | |
| 8,828,067 B2 * | 9/2014 | Tipirneni | A61B 17/8869 |
| | | | 606/320 |
| 9,247,946 B2 | 2/2016 | Cavallazzi | |
| 9,486,262 B2 | 11/2016 | Andermahr | |
| 9,572,589 B2 | 2/2017 | Knape | |
| 10,786,292 B2 | 9/2020 | Singh | |
| 2005/0234467 A1 | 10/2005 | Rains | |
| 2006/0116679 A1 | 6/2006 | Lutz | |
| 2008/0009871 A1 | 1/2008 | Orbay | |
| 2014/0018810 A1 * | 1/2014 | Knape | A61B 17/1633 |
| | | | 606/80 |
| 2015/0374425 A1 | 12/2015 | Hashmi | |
| 2019/0328431 A1 | 10/2019 | Davison | |
| 2020/0187998 A1 | 6/2020 | Zingalis | |

OTHER PUBLICATIONS

Depuy Synthes, "Modular Mini Fragment LCP System", www.depuysynthes.com, Aug. 2019.
Depuy Synthes, "Universal Small Fragment System—Surgical Technique" www.depuysynthes.com, Jun. 2022.
Depuy Synthes, "2.4 mm Variable Angle LCP Distal Radius System—Surgical Technique" www.depuysynthes.com, May 2021.
DePuy Synthes, "323.202 drill guide", Feb. 2020.

* cited by examiner

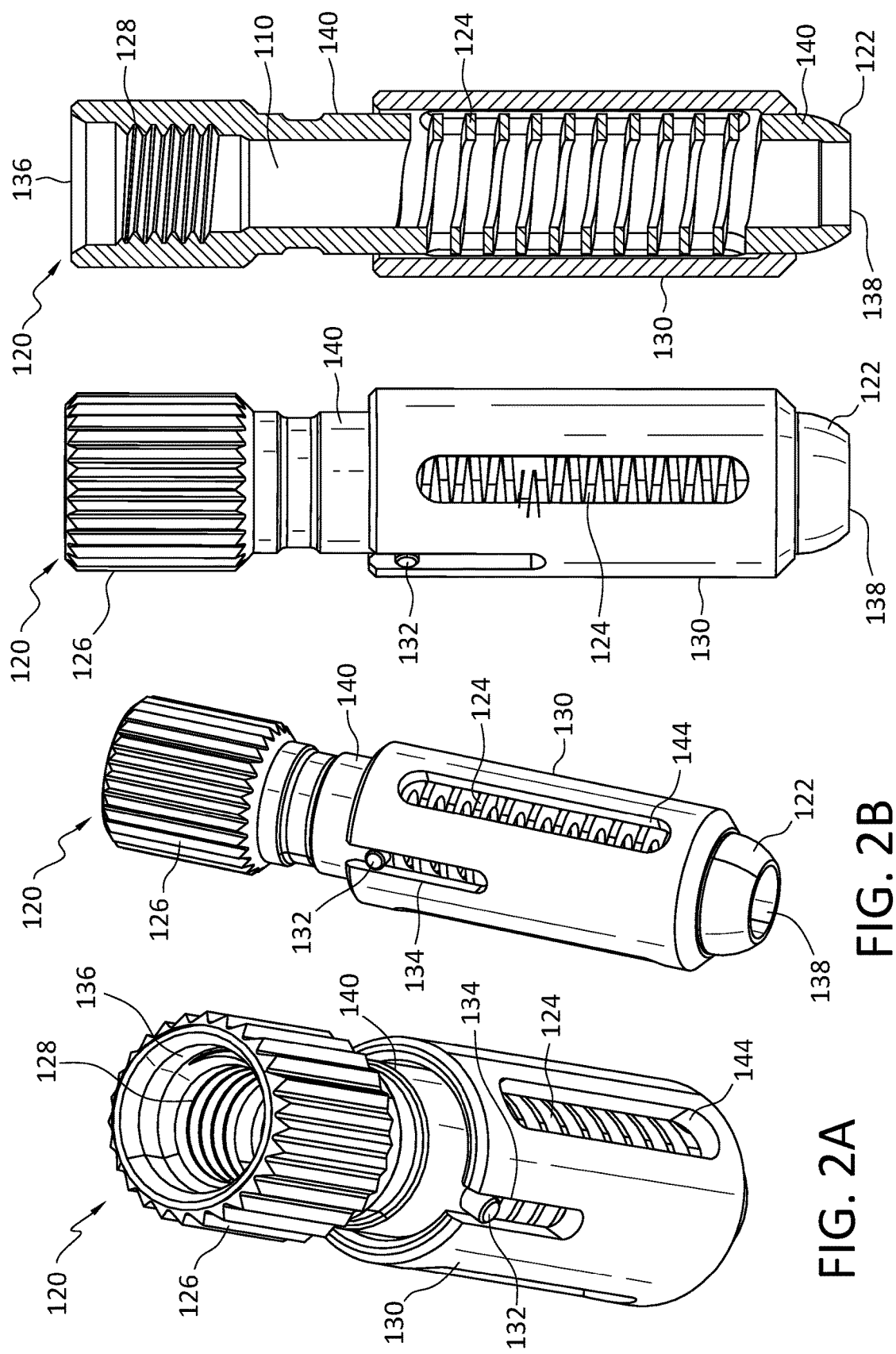

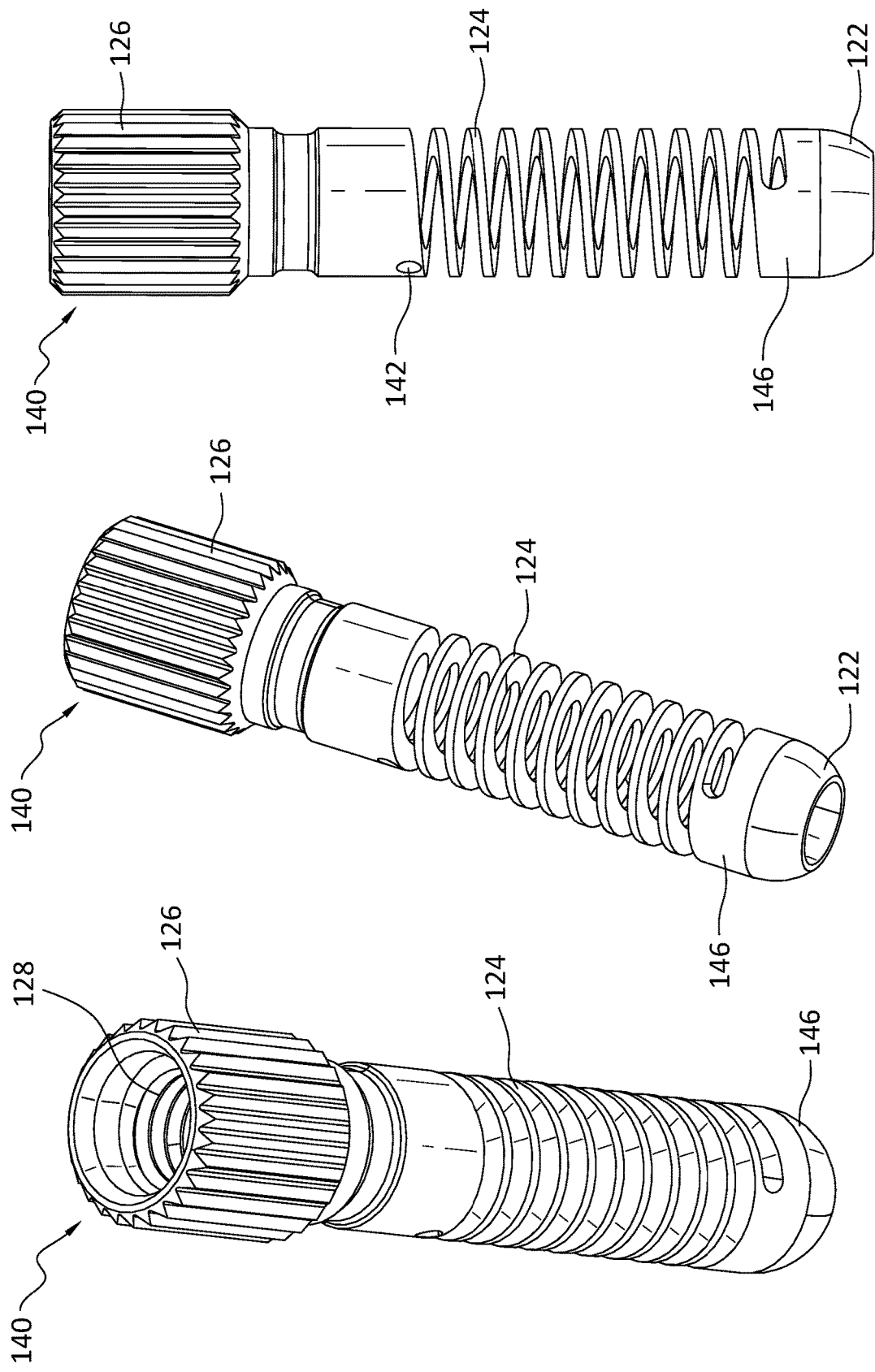

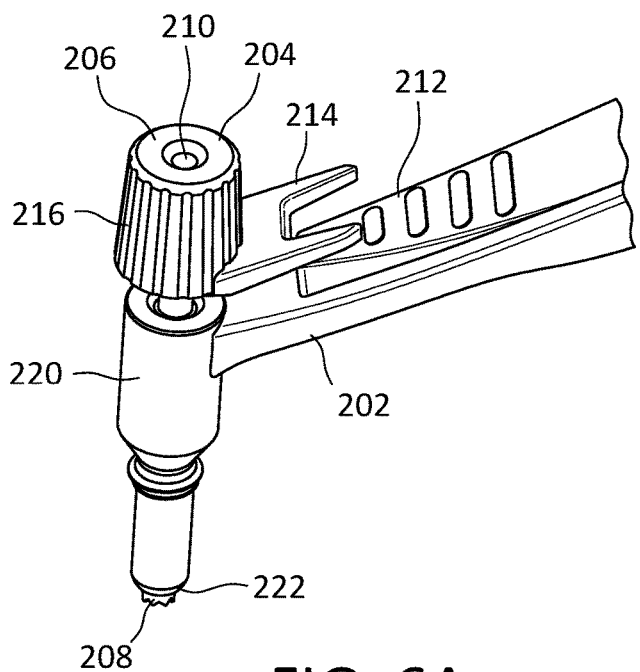 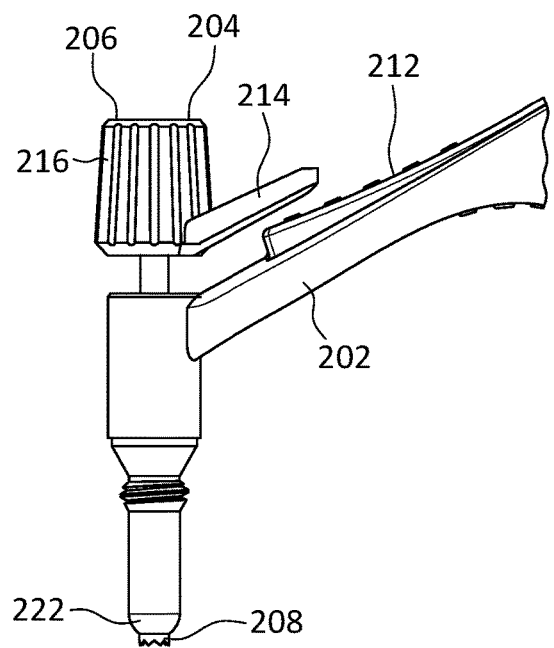
FIG. 6A            FIG. 6B
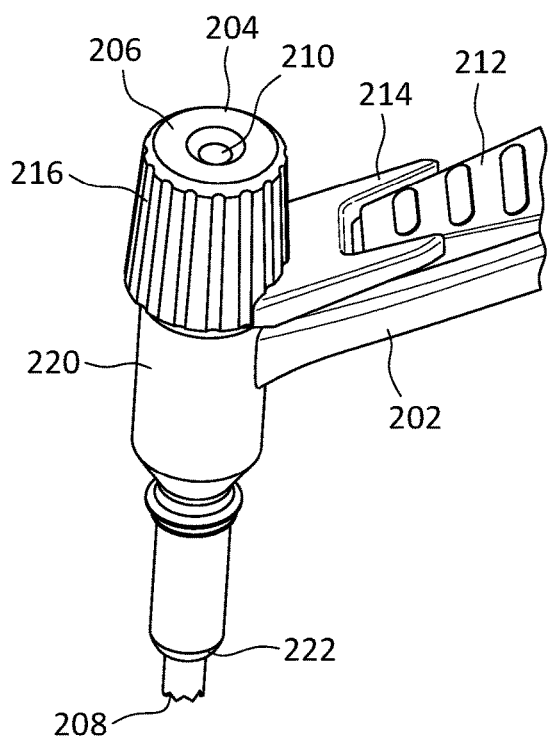 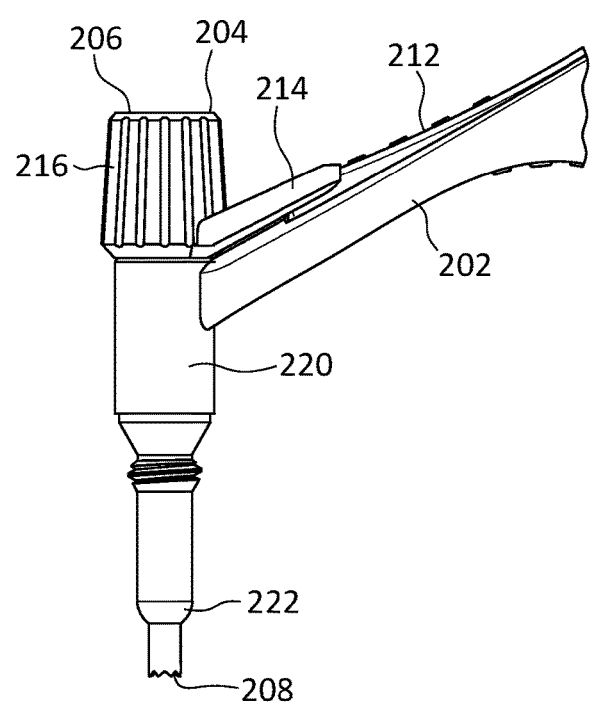
FIG. 6C            FIG. 6D

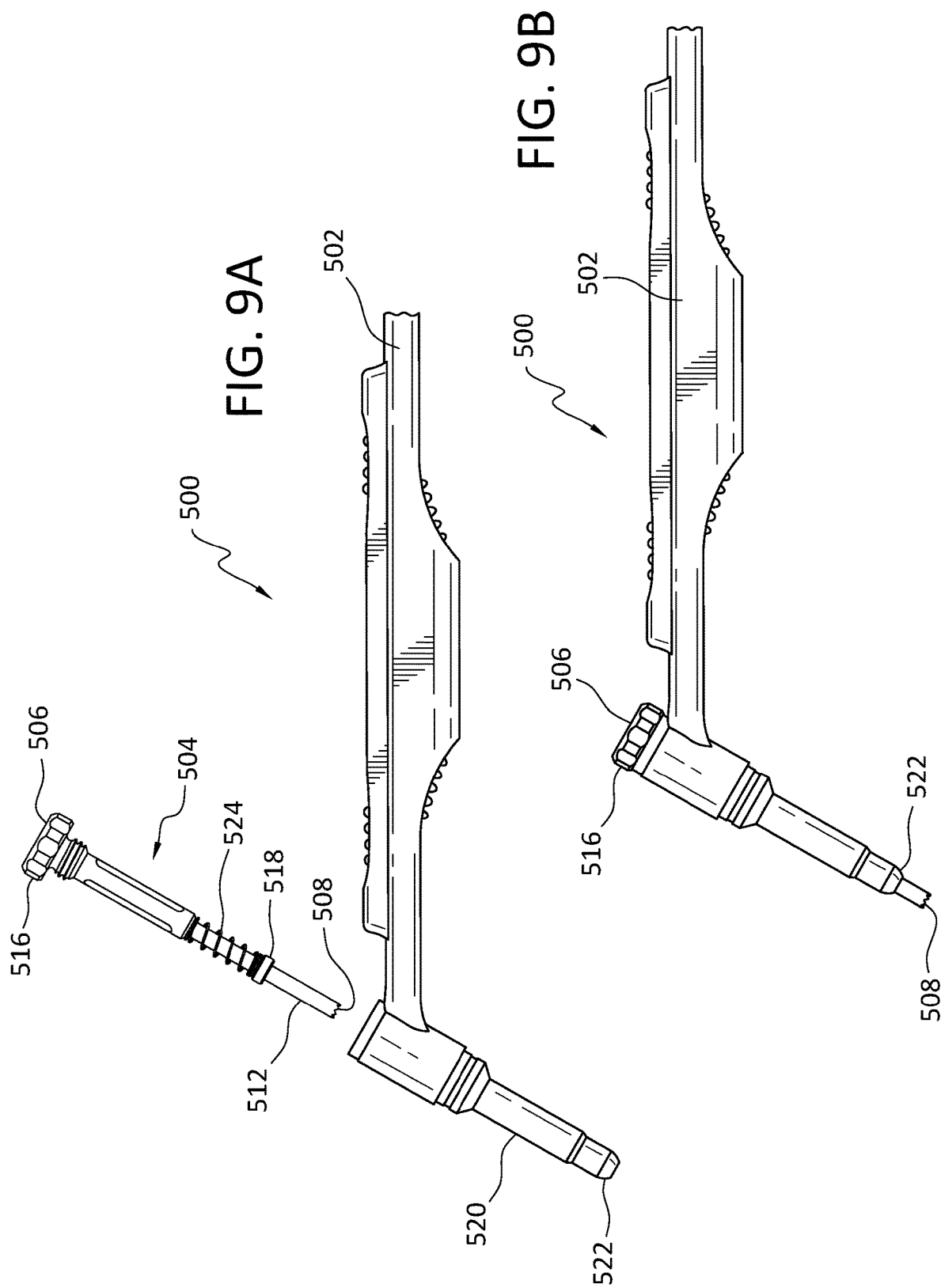

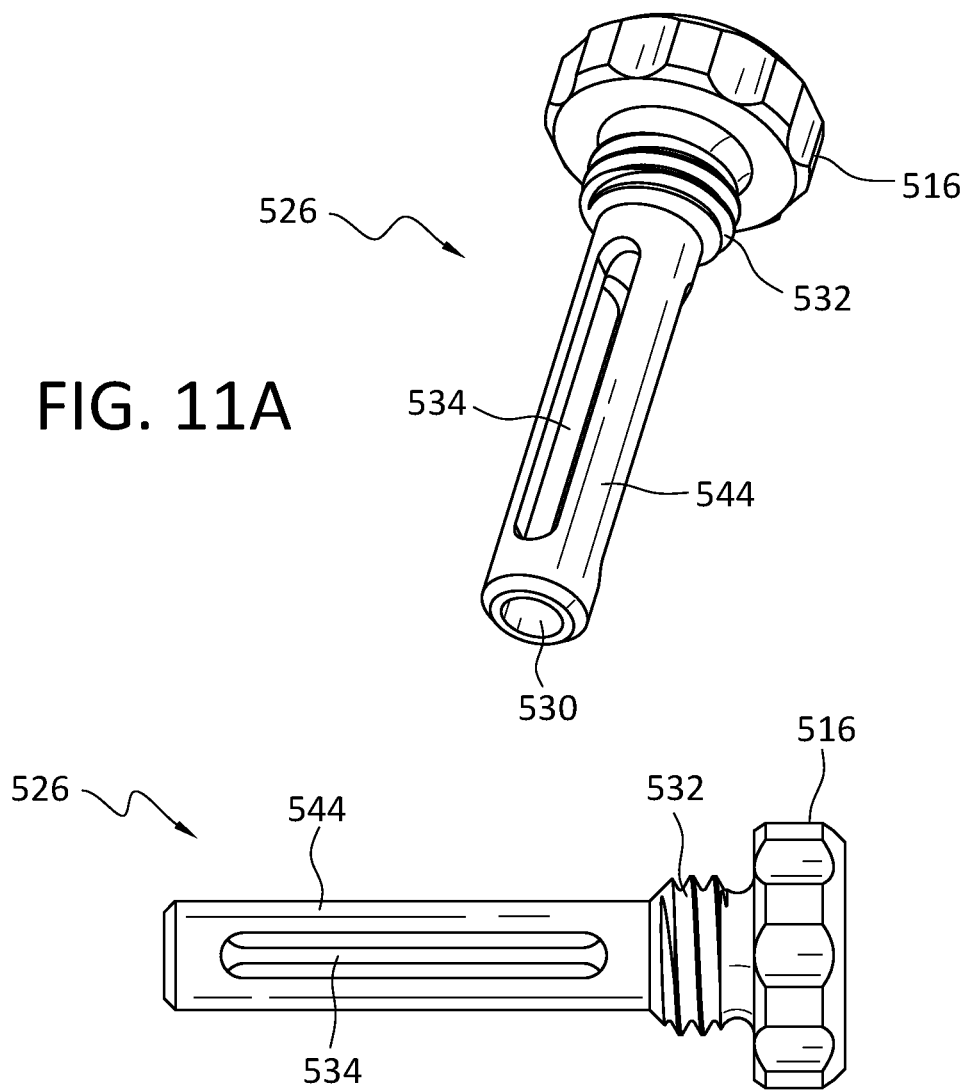
FIG. 11A
FIG. 11B
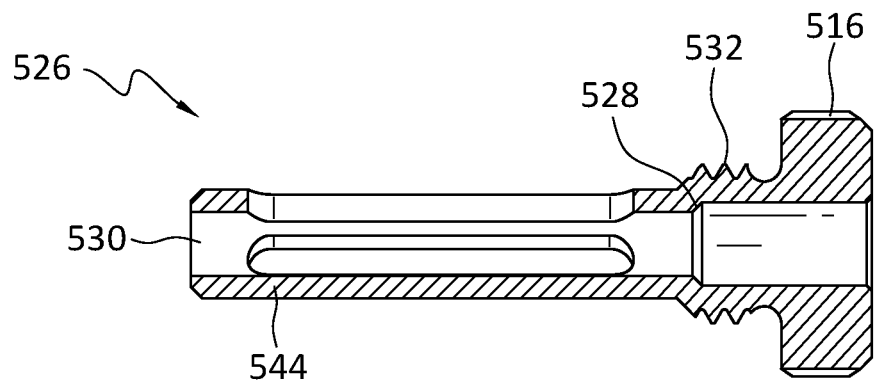
FIG. 11C

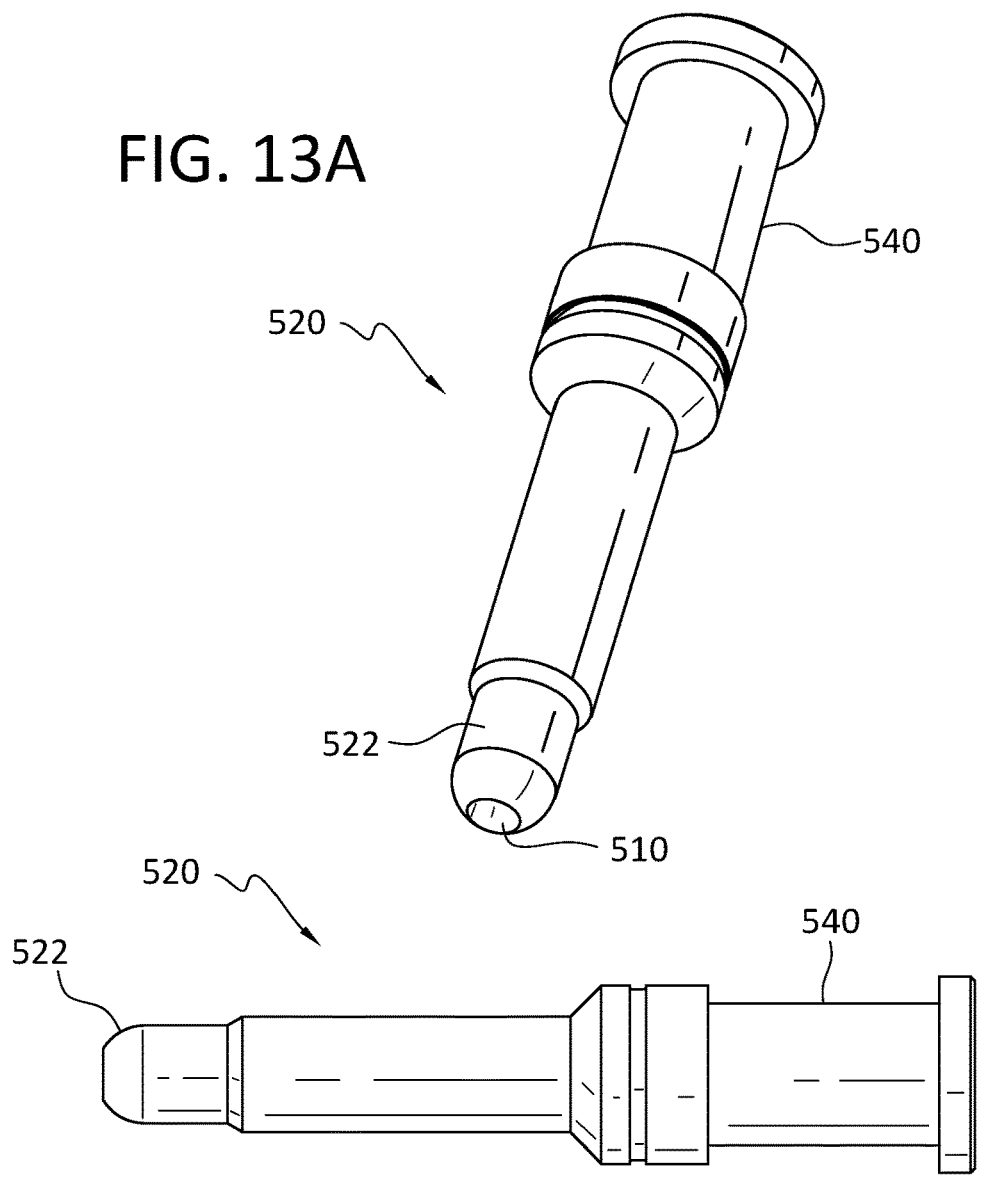
FIG. 13A
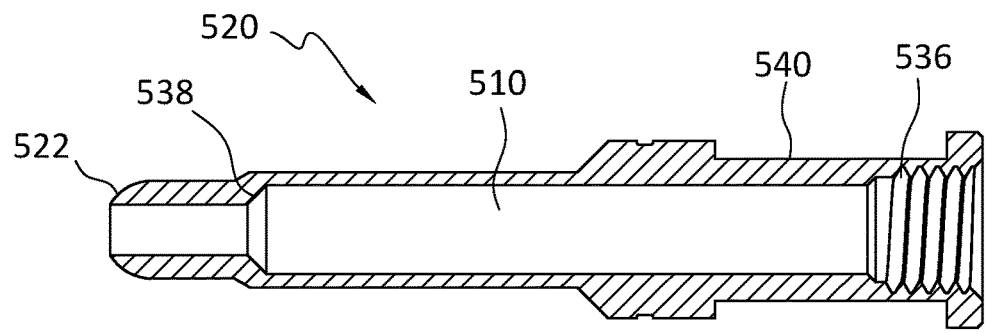
FIG. 13B
FIG. 13C

COMPRESSION/NEUTRAL DRILL GUIDE SLEEVE

CROSS-REFERENCE TO RELATED APPLICATION

This application claims the benefit of U.S. Provisional Patent Application No. 63/285,264, filed Dec. 2, 2022 and U.S. Provisional Patent Application No. 63/371,051, filed Aug. 10, 2022, which are incorporated, for all purposes, by reference herein in its entirety.

TECHNICAL FIELD

Various exemplary embodiments disclosed herein relate generally to a compression/neutral drill guide sleeve that allows a surgeon to drill offset holes for a compression plate or neutral holes.

BACKGROUND

Bone plates are widely used to secure bone fractures. Such bone plates include a number of holes, and screws are inserted through the holes into the bone and/or bone fragments to be repaired. Typically a surgeon will use a drill guide to accurately drill holes in the bone to receive the screws used to secure the bone plate to the bone via plate holes. The drill guide ensures that a hole drilled in the bone is axially aligned with the plate hole in the bone plate or at some other desired angle. Cortical screws have been developed that allow for the insertion of the screw that secures the bone plate at various angles.

Variable angle screws provide the ability to create a fixed-angle construct while also allowing the surgeon the freedom to choose the screw trajectory. A fixed-angle construct provides advantages in osteopenic bone or multi-fragmentary fractions. With variable angle (VA) screw technology, screw angulation is unlimited with a specified cone angle around the central axis of the bone plate hole. Cortical screws enable optimal screw positioning and offers many benefits by allowing the surgeon to: target fragments with high-quality bone; adjust screw direction after bending the plate; position screws precisely to avoid joint penetration; redirect screw position to avoid existing implants, prostheses, or independent lag screws; and adapts screw position to accommodate varied patient anatomy and capture fracture fragments.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a drill guide assembly configured to engage a drill bit, including: a drill guide including: a drill guide tube including a ring and a flared end at a proximal end of the drill guide tube; a drill guide body with a central opening configured to receive the drill guide tube and a tube stop configured to engage the flared end; and a spring configured to engage the ring and distal end of the drill guide body; and a drill guide sleeve with a central opening configured to receive the drill guide including a ring stop configured to engage the ring and a sleeve distal end configured to engage a plate hole on a bone plate, wherein the spring is configured to bias the drill guide tube in a distal direction so that a distal end of the drill guide tube extends from the sleeve distal end.

Various embodiments are described, wherein drill guide body includes external threads and the drill guide sleeve includes internal threads configured to engage the external threads to securely fasten the drill guide body to the drill guide sleeve.

Various embodiments are described, wherein drill guide body includes a knob at a proximal end to facilitate rotating the drill guide body to engage the external threads with the internal threads.

Various embodiments are described, wherein the drill guide body includes a tube portion with a body window configured to facilitate cleaning of the drill guide body.

Various embodiments are described, wherein the sleeve distal end is rounded and configured to align the drill guide tube in the plate hole.

Various embodiments are described, wherein a distal end of the drill guide tube has teeth.

Various embodiments are described, further comprising a handle configured to attach to the drill guide sleeve.

Various embodiments are described, wherein the drill guide is a single removable unit that facilitates cleaning.

Further various embodiments relate to a method of drilling a hole in a bone through a plate hole in a bone plate using the drill guide assembly described above, including: placing a distal end of the drill guide tube in contact with the bone through the plate hole; applying a downward force on the drill guide sleeve until the sleeve distal end engages the plate hole and aligns the drill guide tube with the plate hole; and drilling a hole in the bone by placing a drill bit in the drill guide tube.

Various embodiments are described, further comprising moving the drill guide sleeve to a desired drilling angle after applying the downward force.

Further various embodiments relate to a method of drilling a hole in a bone through a plate hole in a bone plate using the drill guide assemble described above, including: placing a distal end of the drill guide tube in contact with the bone through the plate hole in an offset position; and drilling a hole in the bone by placing a drill bit in the drill guide tube so that the sleeve distal end does not engage the plate hole.

Further various embodiments relate to a drill guide assembly configured to engage a drill bit, including: a drill guide tube including a ring; a spring; a drill guide sleeve with a central opening configured to receive the drill guide tube and the spring and a spring stop; a nose configured to connect to the drill guide sleeve, wherein the nose has a central opening configured to receive the drill guide tube and a nose distal end configured to engage a plate hole on a bone plate; and configured to engage the ring and spring stop, wherein the spring is configured to engage the ring and spring stop and to bias the drill guide tube in a distal direction so that a distal end of the drill guide tube extends from the nose distal end.

Various embodiments are described, wherein nose includes external threads and the drill guide sleeve includes internal threads configured to engage the external threads to securely fasten the nose to the drill guide sleeve.

Various embodiments are described, wherein a proximal end of the nose is a ring stop configured to limit a distal movement of the ring.

Various embodiments are described, wherein the nose includes a nose window and the drill guide sleeve includes a sleeve window configured to facilitate cleaning of the nose and the drill guide sleeve.

Various embodiments are described, wherein the nose distal end is rounded and configured to align the drill guide tube in the plate hole.

Various embodiments are described, wherein a distal end of the drill guide tube has teeth.

Various embodiments are described, further comprising a handle configured to attach to the drill guide sleeve.

Further various embodiments relate to a method of drilling a hole in a bone through a plate hole in a bone plate using the drill guide assembly as described above, including: placing a distal end of the drill guide tube in contact with the bone through the plate hole; applying a downward force on the drill guide sleeve until the nose distal end engages the plate hole and aligns the drill guide tube with the plate hole; and drilling a hole in the bone by placing a drill bit in the drill guide tube.

Various embodiments are described, further comprising moving the drill guide sleeve to a desired drilling angle after applying the downward force.

Further various embodiments relate to a method of drilling a hole in a bone through a plate hole in a bone plate using the drill guide assemble as described above, including: placing a distal end of the drill guide tube in contact with the bone through the plate hole in an offset position; and drilling a hole in the bone by placing a drill bit in the drill guide tube so that the nose distal end does not engage the plate hole.

Further various embodiments relate to a drill guide sleeve configured to engage a drill guide, including: a sleeve having a plurality of openings; an inner member including: a grip; an end member having a distal end configured to align the drill guide to drill a neutral hole; and a spring connected between the grip and the end member, wherein the inner member is disposed within the sleeve, and wherein the distal end of the sleeve is connected to the end member.

Various embodiments are described, wherein the grip has internal threads configured to engage the drill guide.

Various embodiments are described, wherein the inner member is a unitary member.

Various embodiments are described, further including a pin, wherein the grip has a pin opening with the pin disposed therein, wherein the sleeve has a pin slot configured to limit the motion of the pin, and wherein the pin extends into the pin slot.

Various embodiments are described, wherein the distal end is rounded.

Further various embodiments relate to a drill guide assembly, including: a drill guide including: a knob; a locking member connected to the knob; and external threads; a drill guide sleeve including: a handle including a locking protrusion configured to engage the locking member to prevent rotation of the drill guide; a body connected to the handle including a passage configured to accept the drill guide; internal threads configured to engage the external threads; a cavity configured to accept the external threads; and a distal end configured to align the drill guide to drill a neutral hole.

Various embodiments are described, wherein when the locking member is fork shaped.

Various embodiments are described, wherein the distal end is rounded.

Further various embodiments relate to a drill guide assembly, including: a drill guide including: a knob; a stop; and external threads; a drill guide sleeve including: a handle including a locking member, wherein the locking member engages the drill guide to prevent rotation of the drill guide; a body connected to the handle including a passage configured to accept the drill guide; internal threads configured to engage the external threads; a cavity configured to accept the external threads; and a distal end configured to align the drill guide to drill a neutral hole.

Various embodiments are described, wherein the locking member includes sides configured to engage sides of the handle to prevent rotation of the drill guide.

Various embodiments are described, wherein the locking member further includes a locking tab configured to engage the knob and stop.

Various embodiments are described, wherein the distal end is rounded.

Further various embodiments relate to a drill guide assembly, including: a drill guide including: a knob; and external threads; a drill guide sleeve including: a handle; a body connected to the handle including a passage configured to accept the drill guide; first internal threads configured to engage the external threads; second internal threads configured to engage the external threads; a cavity between the first internal threads and the second internal threads configured to accept the external threads; and a distal end configured to align the drill guide to drill a neutral hole.

Various embodiments are described, wherein the distal end is rounded.

BRIEF DESCRIPTION OF THE DRAWINGS

In order to better understand various exemplary embodiments, reference is made to the accompanying drawings, wherein:

FIGS. 2A-F illustrate top perspective, bottom perspective, side, cross-sectional, top, and bottom views of the drill guide sleeve;

FIGS. 4A-C illustrate top perspective, bottom perspective, and side views of the inner member;

FIGS. 6A-D illustrate another embodiment of a drill guide sleeve;

FIGS. 9A and 9B illustrate side views of another embodiment of a drill guide assembly;

FIGS. 11A-11C illustrate perspective, side, and cross-sectional views of the drill guide body;

FIGS. 13A-13C illustrate perspective, side, and cross-sectional views of the drill guide sleeve;

To facilitate understanding, identical reference numerals have been used to designate elements having substantially the same or similar structure and/or substantially the same or similar function.

DETAILED DESCRIPTION

Figure 1A:
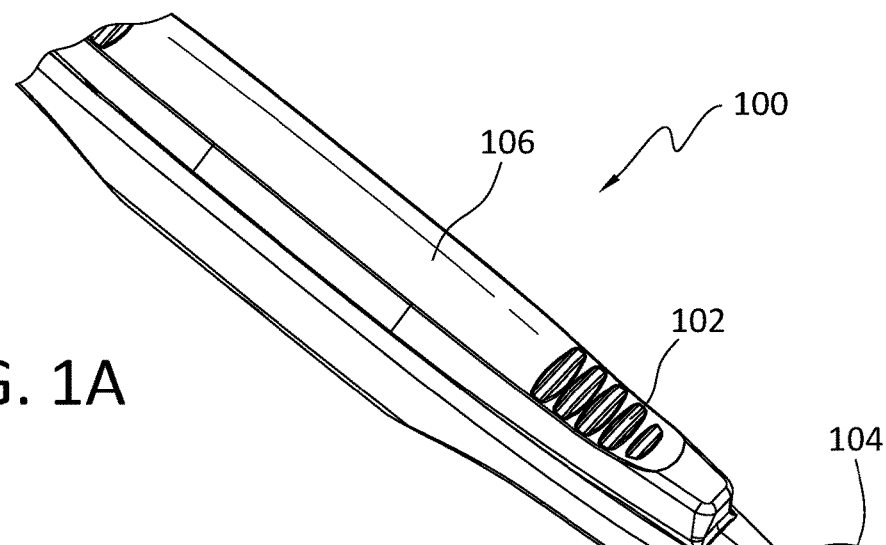
FIGS. 1A-C illustrate perspective, side, and cross-sectional views of a drill guide assembly.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Compression plates may be used in order to assist in compressing a bone fragment in order to reduce a facture. Compression plates have holes that have an opening that are larger at the surface of the plate and that reduce in size with a compression portion including a sloping or other surface that engages the head of the screw. A bone screw or other fixation element inserted into the plate hole in the compression plate imparts a force to the bone plate to move the bone plate laterally relative to a portion of bone into which the bone screw is inserted. This allows for compression and reduction of bone fragments attached to the compression plate. Such holes may also accommodate cortical screws allowing the cortical screws to be inserted at various angles as required in order to treat and secure a specific fracture. A screw hole in the bone needs to be offset in the plate hole relative to the bone fraction to be compressed and reduced. As a result the drill guide used to drill the hole may be offset from the center of the plate hole in order to facilitate this compression of the bone. Such a drill guide may have an outer diameter smaller than the diameter of the plate hole to facilitate the drilling of the offset hole. In other situations, the hole drilled in the bone is a neutral hole, which is a hole drilled in the center of the plate hole. In order to facilitate such a neutral hole, a drill guide sleeve with a rounded end may be placed over the drill guide. The rounded end is shaped to center the drill guide in the plate hole of the plate and facilitates the drilling of a neutral hole. Further, the rounded head may allow for drilling an angled neutral hole at a desired angle as well.

The drill guide sleeve may be slide over the drill guide and connected to the drill guide to provide this neutral hole drilling capability. In one prior drill guide sleeve, the drill guides tip does not extend far enough from the drill guide sleeve to protect the plate including the plate hole threads during drilling into the bone. In another prior drill guide sleeve, an internal spring is used between the drill guide and the drill guide sleeve, to allow the drill guide to variably extend from the sleeve when drilling neutral holes. The problem with this drill guide sleeve is that it includes small parts, especially the spring that may be easily lost or damaged when the drill guide sleeve is reprocessed and sanitized. Embodiments of a drill guide sleeve will be described below that overcome the problems with the existing drill guide sleeve designs.

Figure 1B:
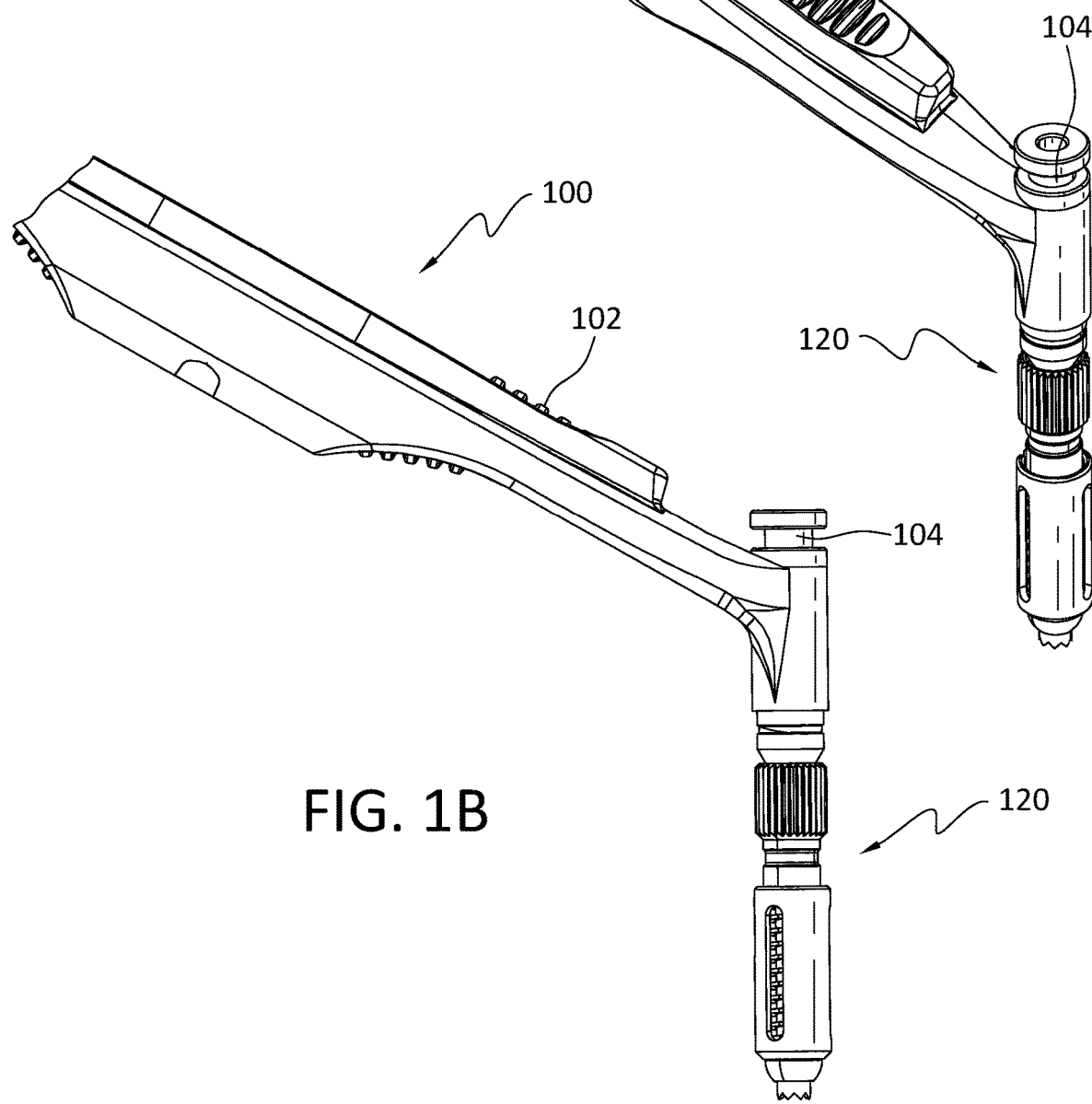
Figure 1C:
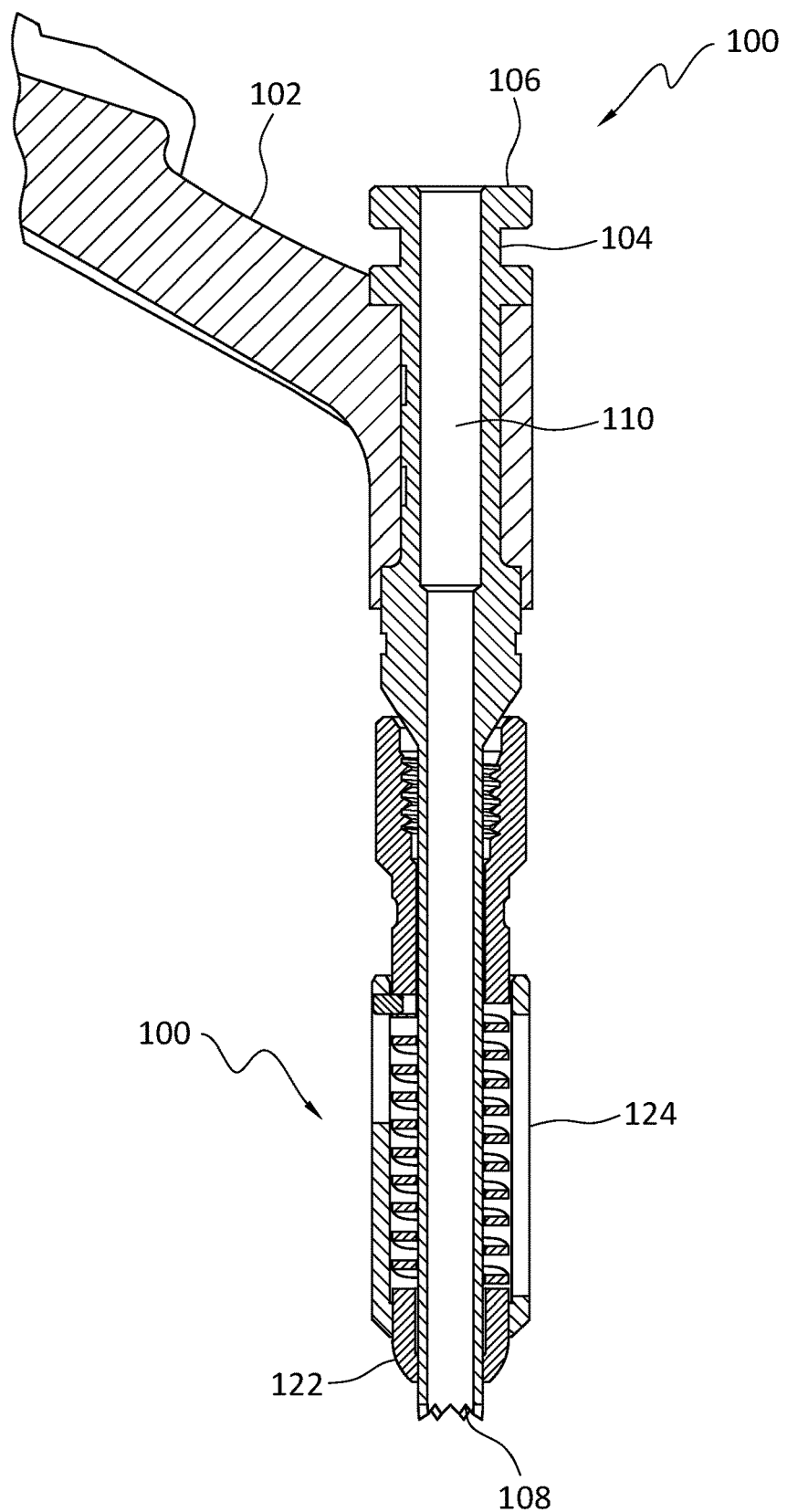
Figure 2E:
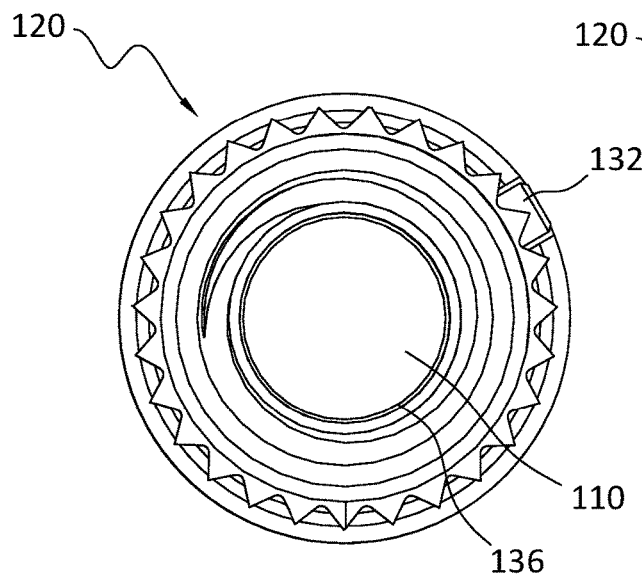
Figure 2F:
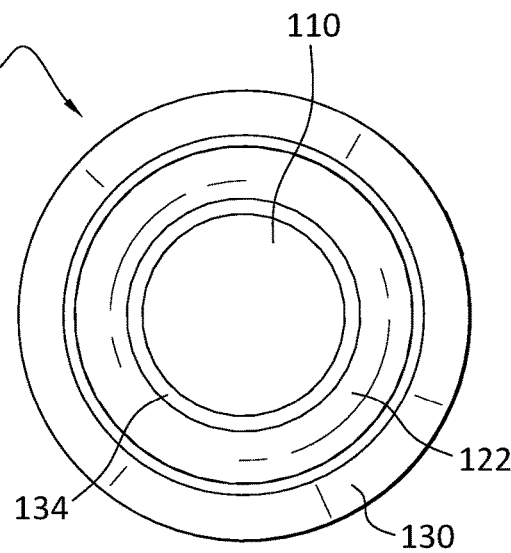

FIGS. 1A-C illustrate perspective, side, and cross-sectional views of a drill guide assembly. The drill guide assembly 100 includes a drill guide handle 102, a drill guide 104, and a drill guide sleeve 120. The drill guide 104 may have a proximal end 106 and a distal end 108 with a drill guide passage 110 that extends between the proximal end 106 and distal end 108. The drill guide passage 110 accepts and guides the drill bit used to drill a hole in the bone. When the drill guide 104 is engaged with the drill guide sleeve 120, the proximal end 108 of the drill guide 104 extends beyond a distal end 122 of the drill guide sleeve 120. The distal end 122 may be rounded as described above in order to engage a plate hole and to align and center the drill guide 104 in the plate hole. The drill guide sleeve 120 may include a spring 124 that allows a surgeon to apply a downward force on the drill guide handle 102 as the drill guide 104 is placed in a plate hole, and this will cause the distal end 108 of the drill guide 104 to extend from the drill guide sleeve 120 until the distal end 108 contacts the bone. Because of this variable extension of the proximal end 108 of the drill guide 104, the bone plate are shielded from the drill bit to prevent damage to the bone plate.

Figure 3A:
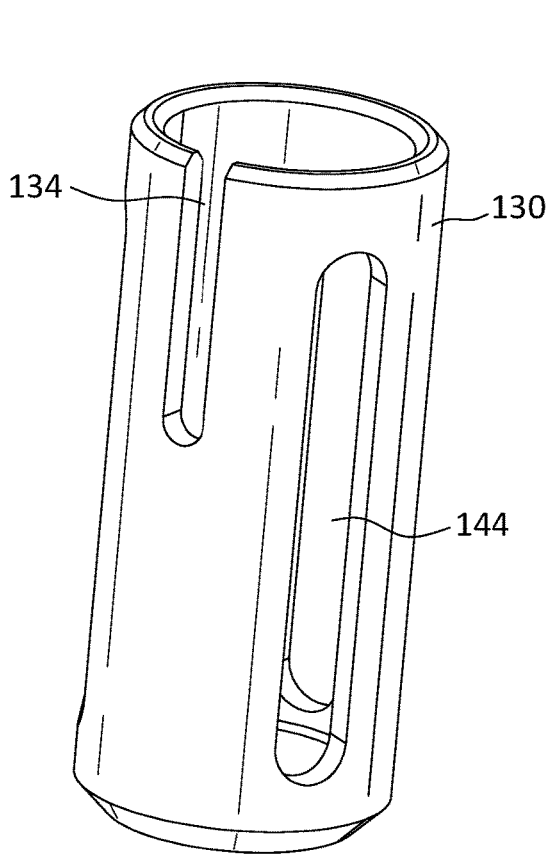
FIGS. 3A-B illustrate a top perspective view of the drill guide sleeve.
Figure 3B:
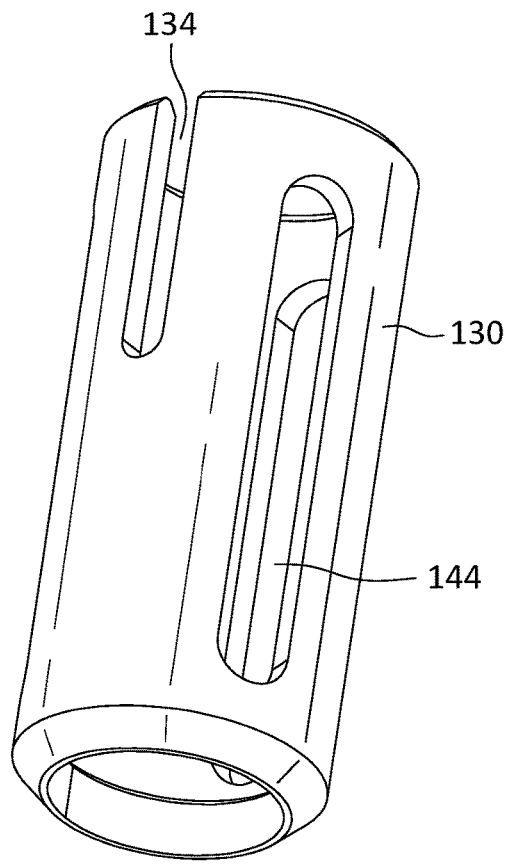

FIGS. 2A-F illustrate top perspective, bottom perspective, side, cross-sectional, top, and bottom views of the drill guide sleeve. The drill guide sleeve 120 includes a shell 130, inner member 140, and a pin 132. FIGS. 3A-B illustrate a top perspective view of the drill guide sleeve 120. FIGS. 4A-C illustrate top perspective, bottom perspective, and side views of the inner member 140. The inner member 140 includes a grip 125, spring 124, and end member 146. The grip 126 may have a knurled surface that allows a surgeon to securely grip the drill guide sleeve 120. Further, the grip 126 may have a pin opening 142 configured to receive the pin 132. A distal end of the grip 126 is connected to a proximal end of the spring 124. A distal end of the spring 124 is connected to the end member 146. Further, the inner member 140 may have inner threads 128 inside the grip 126. These inner threads 128 may engage the drill guide 104 to secure the drill guide 104 to the drill guide sleeve 120. The inner member 140 illustrated in FIGS. 4A-C are shown as a unitary structure. For example, the spring 124 may be formed by cutting away portions of a tube resulting in the structure shown. In another embodiment, the spring may be manufactured separately, and then connected to the grip 126 and the end member 146. Either approach results in an inner member 150 having an integrated spring that overcomes various problems that arise when a stand alone spring is used in the drill guide sleeve, e.g., loss of the spring or damage to the spring.

The shell 130 has a generally tubular shape that includes shell openings 144. The shell openings 144 are shown as elongated oval openings extending along a length of the shell 130. The shell openings facilitate cleaning and sanitizing of the drill guide sleeve 120 without taking the drill guide sleeve 120 apart. The shell openings 144 are shown as elongate ovals, but other shapes may be used instead, as long as they provide sufficient access to the interior of the drill guide sleeve 120, the inner member 140, and the spring 124.

The pin 132 extends from the pin opening 142 on the inner member 140 into the pin slot 134 of the shell 130. As the spring 124 compresses and expands, the pin 132 will move along the pin slot 134. Further, the pin 132 prevents rotation between the inner member 140 and the shell 130. For example, when surgeon attaches the drill guide sleeve 120 to a drill guide 104, the drill guide handle may be held in one hand and the drill guide sleeve 120 is rotated with the other hand. If the surgeon grips the shell 130 to rotate the drill guide sleeve 120, then the pin 132 prevents rotation between the inner member 140 and the grip 126. This will protect the spring 124 from unwanted twisting and stress.

The distal end of the sleeve 130 may be connected to end member 146 of the inner member 140. This may be done using various methods, for example, by welding, a fastener, a pin, etc. As a result, a downward force placed on the drill guide 104 when the drill guide sleeve 120 is engaged with the plate hole will cause the spring 124 to compress resulting in the distal end 108 of the drill guide 104 extending further out from the distal opening 138 of the drill guide sleeve 120 in order to provide protection to the bone plate from the drill bit when drilling neutral holes.

Figure 5A:
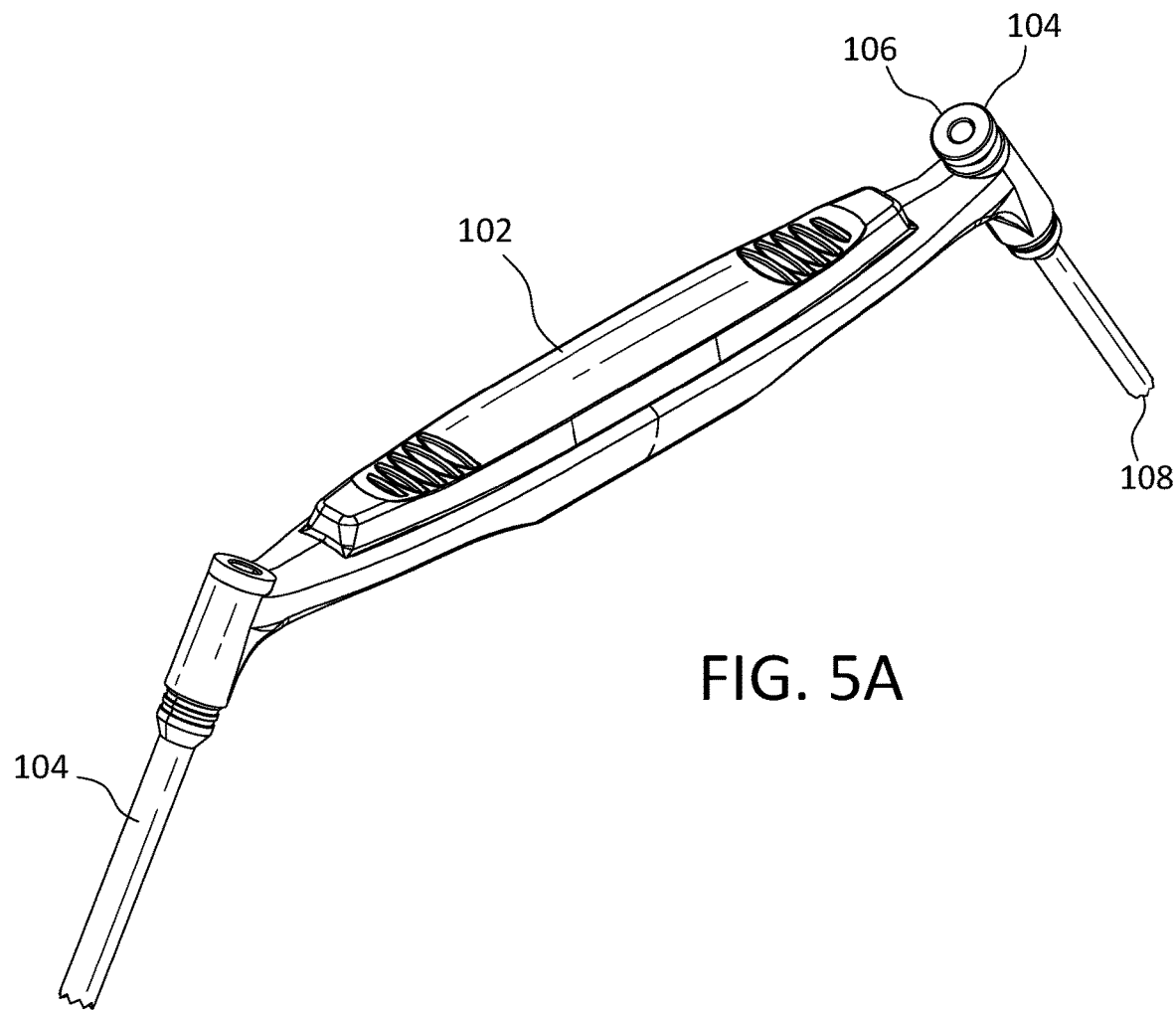
FIGS. 5A-5B illustrate a drill guide handle with two different drill guides.
Figure 5B:
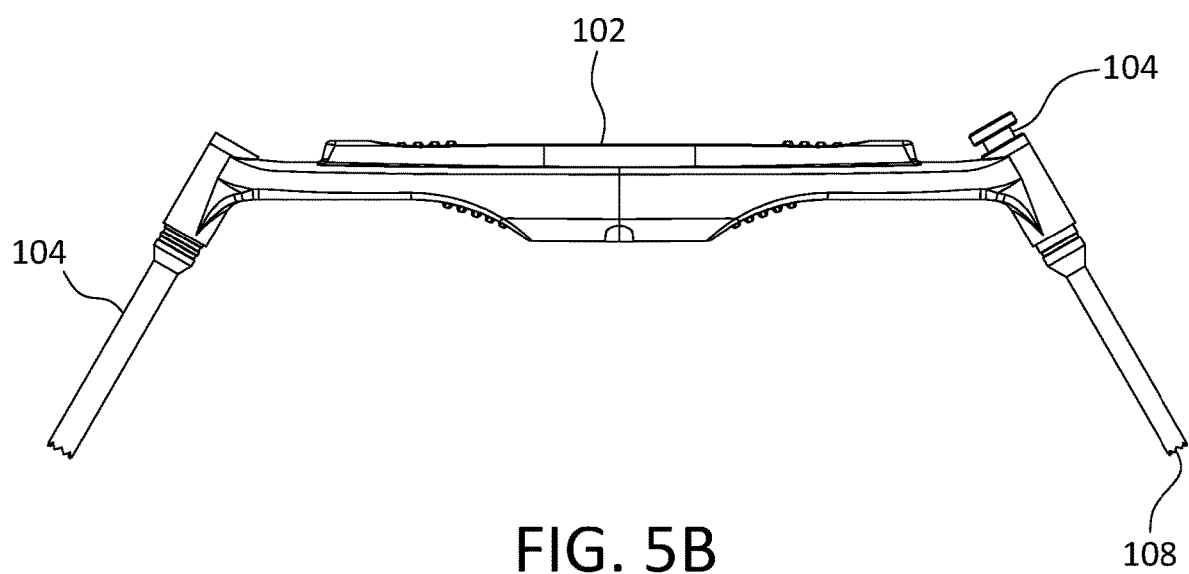

FIGS. 5A-5B illustrate a drill guide handle with two different drill guides. The drill guide handle 102 may be attached to two different drill guides 104 at opposite ends. The drill guides 104 may have different characteristics for use in different situations. The drill guide 104 may have a proximal end 104 and a distal end 108, with an opening extending in between that accepts a drill bit. The proximal end 108 may have teeth on its edge which facilitate a secure and stable connection with the bone during drilling operations. Although not shown, the drill guides 104 may have external threads configured to engage the inner threads 128 of the drill guide sleeve 120 to provide for a secure engagement of the drill guide sleeve 120 to the drill guide 104.

A surgeon may place the drill guide sleeve 120 on the drill guide 104 in order to drill both offset holes and neutral holes in the bone through the plate hole in the bone plate. This may be done by rotating the drill guide sleeve 120 onto the drill guide 104 if the drill guide 104 has threads. Other connection mechanisms may be used as well. If the surgeon wants to drill a neutral hole, the drill guide 104 is placed in the plate hole of the plate so that the distal end 122 of the drill guide sleeve 120 engages the plate hole and centers the drill guide 104 in the plate hole. Optionally, if an angled screw hole is to be drilled, the surgeon may move the drill guide to the desired angle to drill the hole at the desired angle to drill the hole at the desired angle. Next, the surgeon may press down on the drill guide 104 until the distal end 108 contacts the bone. Then the drill bit is inserted into the drill guide 104 and the hole is drilled. Because of the extension of the distal end 108 of the drill guide 104 to the bone, the bone plate is protected from the drill bit during drilling.

The surgeon may also drill offset holes when the drill guide sleeve is on. In this situation, the drill guide sleeve can be retracted upward so that the distal end 108 of the drill guide 104 completely extends out of the drill guide sleeve 120. The distal end 108 may the be placed in the plate hole in an offset position. At this point, the drill bit may then be inserted into the drill guide to drill the hole.

The dimensions of the drill guide sleeve 120 are selected to allow for the distal end 108 to extend various distances to accommodate different plate thicknesses as well as to allow for offset drilling. As a result, the drill guide sleeve 120 protects the bone plate from the drill bit no matter the thickness of the bone plate.

FIGS. 6A-D illustrate another embodiment of a drill guide sleeve. The drill guide sleeve 220 has a handle 202 with a locking protrusion 212. The locking protrusion 212 is a structure on a top surface of the handle 202 that is configured to engage a locking member 214 on a drill guide 204. The drill guide sleeve 220 also has distal end 222 that may be rounded in order to engage the plate hole. The distal end 222 has the same function as distal end 122 described above.

As described above, the drill guide 204 has a proximal end 206, distal end 208, and a drill guide passage 210 extending between the proximal end 206 and the distal end 208. The drill guide 204 includes a drill guide knob 216 and the locking member 214. The locking member 214 is shown as fork shaped and extending from the drill guide knob 216. The locking member 214 may extend from the drill guide knob 216 at an angle to conform with the angle of the drill guide handle 202. The locking member 214 is shown as having a fork shape where the fork shape engages with the locking protrusion 212 on the drill guide handle 202. FIGS. 6A-B illustrate the drill guide 204 in a raised position. In this position, the locking member 214 is above the locking protrusion 212, so that the drill guide 204 can rotate. FIGS. 6C-D illustrate the drill guide in a lowered position such that the locking member 214 engages the locking protrusion 212. In this position, the drill guide 204 cannot rotate, even when the drill bit rotates to drill the hole.

When the drill guide 204 is used, the drill guide 204 is placed in the plate hole, and the surgeon may place a finger on the locking member 214 to push the drill guide 204 down so that the locking member 214 engages the locking protrusion 212. This extends the distal end 208 of the drill guide 204 out from the drill guide sleeve 220. At this point, when a hole is drilled in the bone, the drill guide 204 will not spin.

It is noted that the locking member 214 and the locking protrusion 212 may take other shapes. For example, the locking protrusion 212 may be fork shaped or have a slot, and the locking member 214 is an elongate member that fits in and engages the locking protrusion 212. Further, the thickness of the locking protrusion 212 is selected to accommodate the thickness of the plates being used with the drill guide sleeve 220.

Figure 7B:
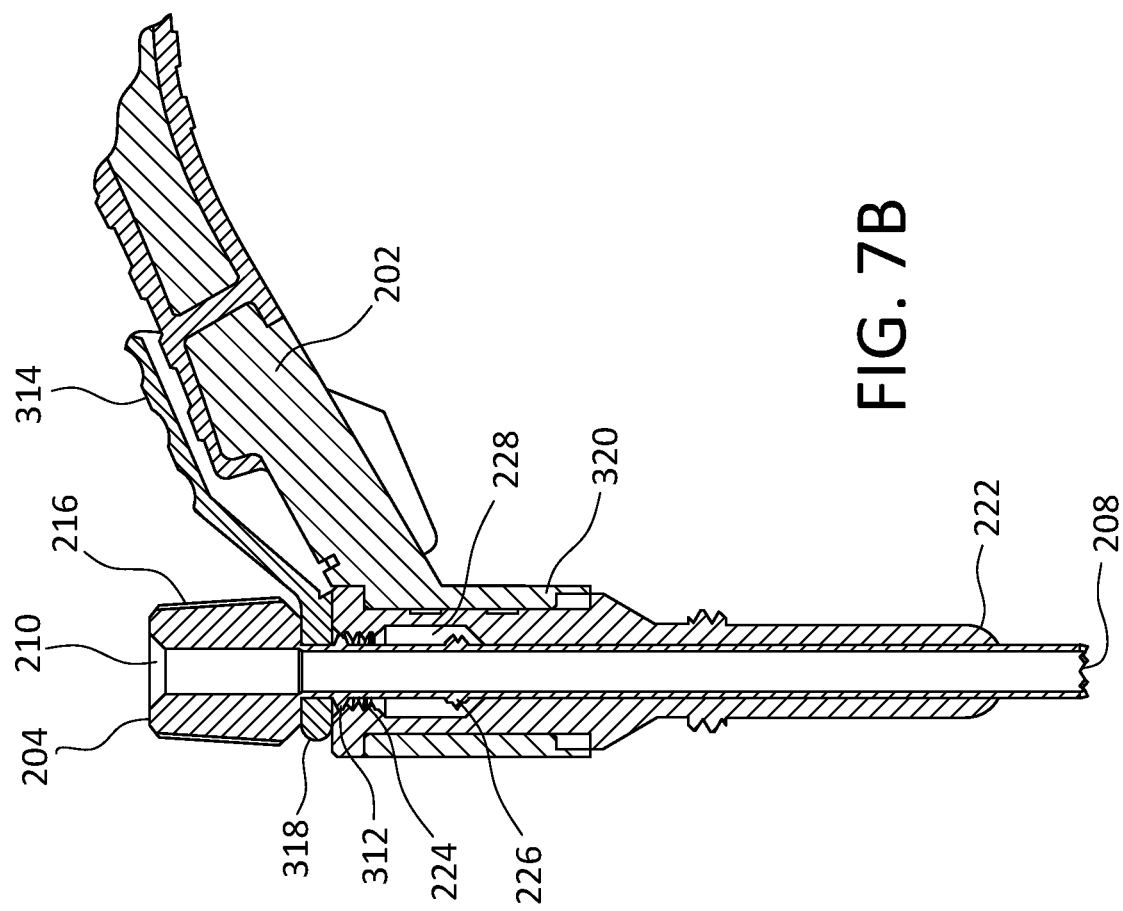
FIGS. 7A-B illustrate a prospective and cross-sectional views of another embodiment of a drill guide sleeve.
Figure 7A:
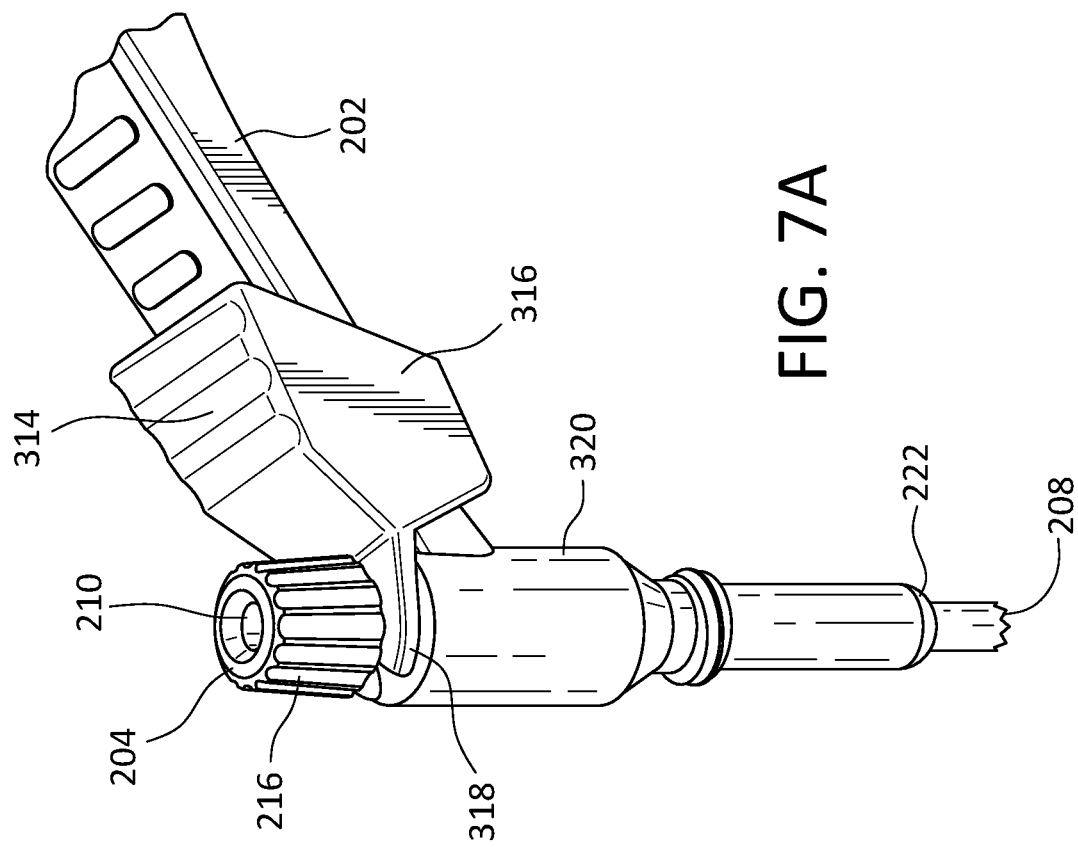

FIGS. 7A-B illustrate a prospective and cross-sectional views of another embodiment of a drill guide sleeve 320. The drill guide sleeve 320 is similar to the drill guide sleeve 220 with the exception of the locking mechanism. The locking mechanism includes the locking member 314. The locking member 314 may include locking tab 318 that extends from the locking member 314 towards the drill guide 210. The locking tab 318 may engage the drill guide knob 216 and stop 312 on the drill guide 204 and this engagement is configured to prevent rotation between the drill guide 204 and the locking member 314. The locking member 316 also has locking member sides 316 that prevent the locking member 314 and the drill guide 204 from rotating, when the drill guide is in a down position like described above. The locking tab 318 is shown as having a slot that slides around the drill guide 204. In another embodiment, the locking tab 318 may include a hole that accepts the drill guide 204 therethrough to prevent the rotation of the drill guide 204.

Further, the drill guide 320 includes a cavity 228. At the top of the cavity 228 are internal threads 224. The drill guide 204 may have external threads 226. The external threads 226 may engage the internal threads 224. When the drill guide 204 continues to be rotated, the external threads 226 progress through the internal threads so that the internal threads are inside the cavity 228. Then the process may be reversed, and the external threads may exit the cavity 228 so that the drill guide 204 may be separated from the drill guide sleeve 320. Such a cavity, external thread, and internal threads may also be found in the drill guide 220.

When the internal threads 226 are in the cavity 228, the internal threads 226 move along the cavity and define a limit on the extension of the distal end 208 of the drill guide 204 from the drill guide sleeve 220/320. The size of the cavity may be selected to cover a range of plate thicknesses and to allow for offset hole drilling. Again, when the drill guide sleeve is in use, the surgeon may place a finger on the locking member 314 to prevent the drill guide 204 from rotating and to also bring the distal end 208 of the drill guide 204 into contact with the bone.

The drill guides 220 and 320 may be used to facilitate the drilling of offset holes and neutral holes as well as angled neutral holes. To drill an offset hole, the surgeon may place a finger on the locking mechanism to extend the drill guide 204 out of the drill guide sleeve 320. The distal end 208 of the drill guide 204 is placed in the desired offset position, and then the surgeon inserts the drill bit in the drill guide 204 to drill the hole.

To drill a neutral hole, the surgeon places the distal end 222 of the drill guide sleeve 220/320 in the plate hole to align and center the drill guide 204 in the hole. Optionally, if an angled hole is to be drilled, the surgeon may move the drill guide 204 to a desired angle. Then the surgeon places a finger on the locking member to ensure that the distal end 208 of the drill guide 204 engages the bone to ensure that the bone plate is protected from the drill bit. Then the surgeon inserts the drill bit in the drill guide 204 to drill the hole.

Figure 8C:
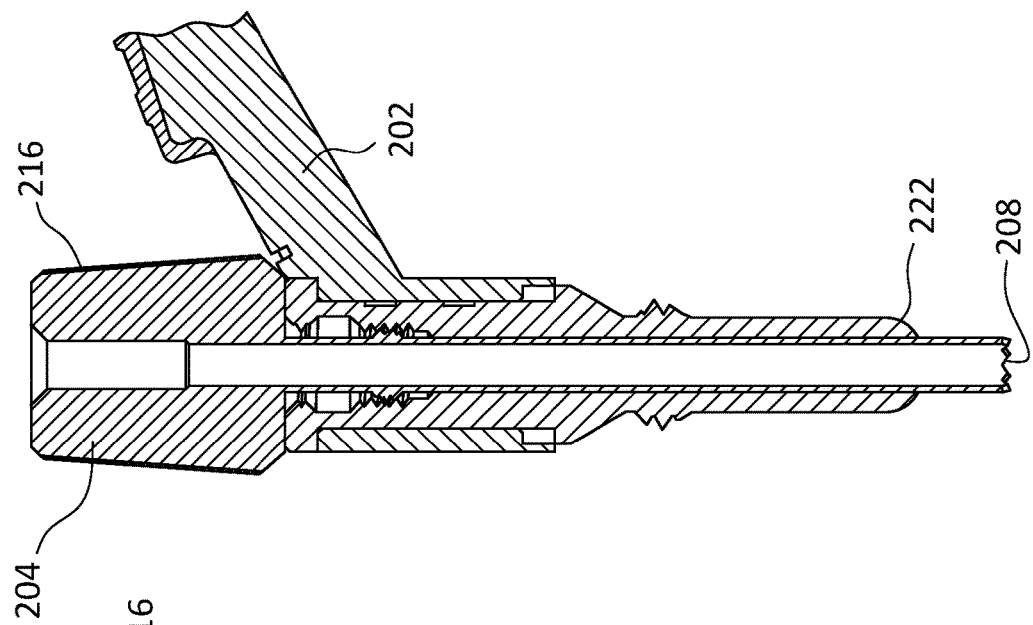
FIGS. 8A-C illustrate cross-sectional views of another embodiment of a drill guide sleeve.
Figure 8B:
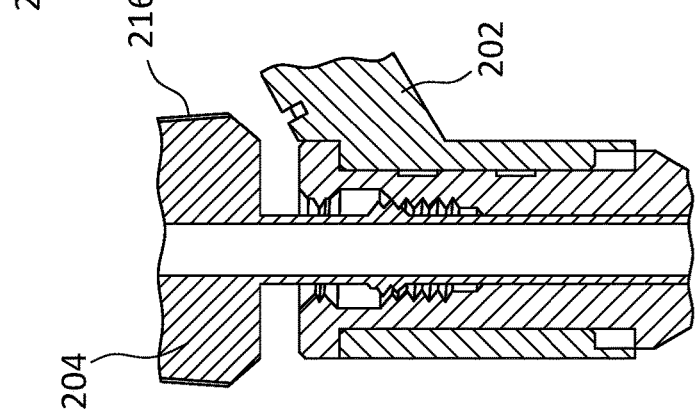
Figure 8A:
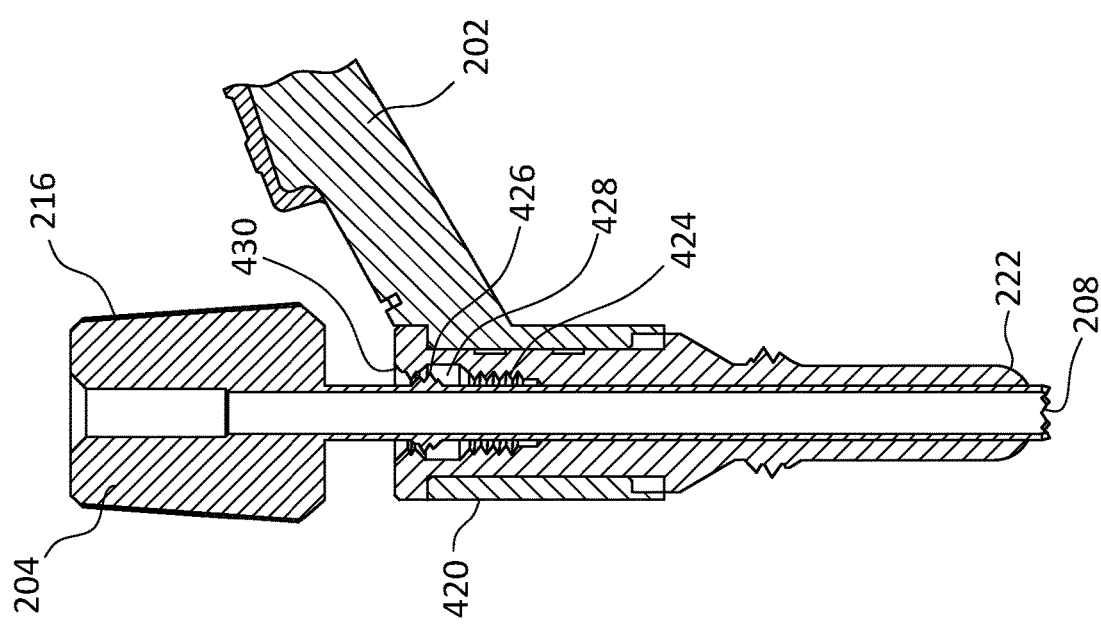

FIGS. 8A-C illustrate cross-sectional views of another embodiment of a drill guide sleeve. The drill guide sleeve 420 has an internal cavity 428, first internal threads 424, and second internal threads 430. The drill guide 204 has external threads 426. The external threads 426 interact with the first internal threads 424, second internal threads 426, and the cavity 428 to define and control the range of motion of the drill guide 204 through the drill guide sleeve 420. To begin with, the drill guide 204 may be inserted into the drill guide sleeve 420 until the external threads 426 engage the second internal threads 430. The drill guide 204 is rotated until the drill guide 204 advances into the cavity 428. With the drill guide in this position, the drill guide 204 is free to move back and forth through a drill guide sleeve 420 over a range defined by the cavity 426. Then the drill guide 204 may be further rotated so that the external threads 426 engage the first internal threads 424. The drill guide 204 may rotated until the external threads 426 reach the end of the first internal threads 424. In this position the distal end 208 is extended as far out of the drill guide sleeve 420 as possible and the drill guide 204 may be used to drill offset holes.

In order to drill a neutral hole, the drill guide 204 is rotated so that the internal threads 426 are in the cavity 428. Then the surgeon places the distal end 222 of the drill guide sleeve 420 in the plate hole to align and center the drill guide 204 in the plate hole. The surgeon may then further rotate the drill guide 204 until the distal end 208 of the drill guide engages the bone. Then the drill bit may be placed in the drill guide 204 to drill the hole.

FIGS. 9A and 9B illustrate side views of another embodiment of a drill guide assembly. The drill guide assembly 500 includes a drill guide handle 502, a drill guide 504, and a drill guide sleeve 520. The drill guide 504 may have a proximal end 506 and a distal end 508 with a drill guide passage 510 that extends between the proximal end 506 and distal end 508. The drill guide passage 510 accepts the drill guide tube 512 that guides the drill bit used to drill a hole in the bone. When the drill guide 504 is engaged with the drill guide sleeve 520, the distal end 508 of the drill guide 504 extends beyond a sleeve distal end 522 of the drill guide sleeve 520. The sleeve distal end 522 may be rounded as described above in order to engage a plate hole and to align and center the drill guide 504 in the plate hole. The drill guide 504 may include a spring 524 that biases the drill guide tube 512 towards the distal end 508 so that the distal end 508 extends beyond the sleeve distal end 522. Then a surgeon places the drill guide 504 in a plate hole so that the distal end 508 engages the bone, and then the surgeon may apply a downward force on the drill guide handle 502 until the sleeve distal end 522 engages the plate hole. This engagement will cause the sleeve distal end 522 of the drill guide tube 512 to be aligned in the plate hole and the plate hole and the bone plate are shielded from the drill bit to prevent damage to the bone plate because of the drill guide tube 512.

Figures 10A, 10B:
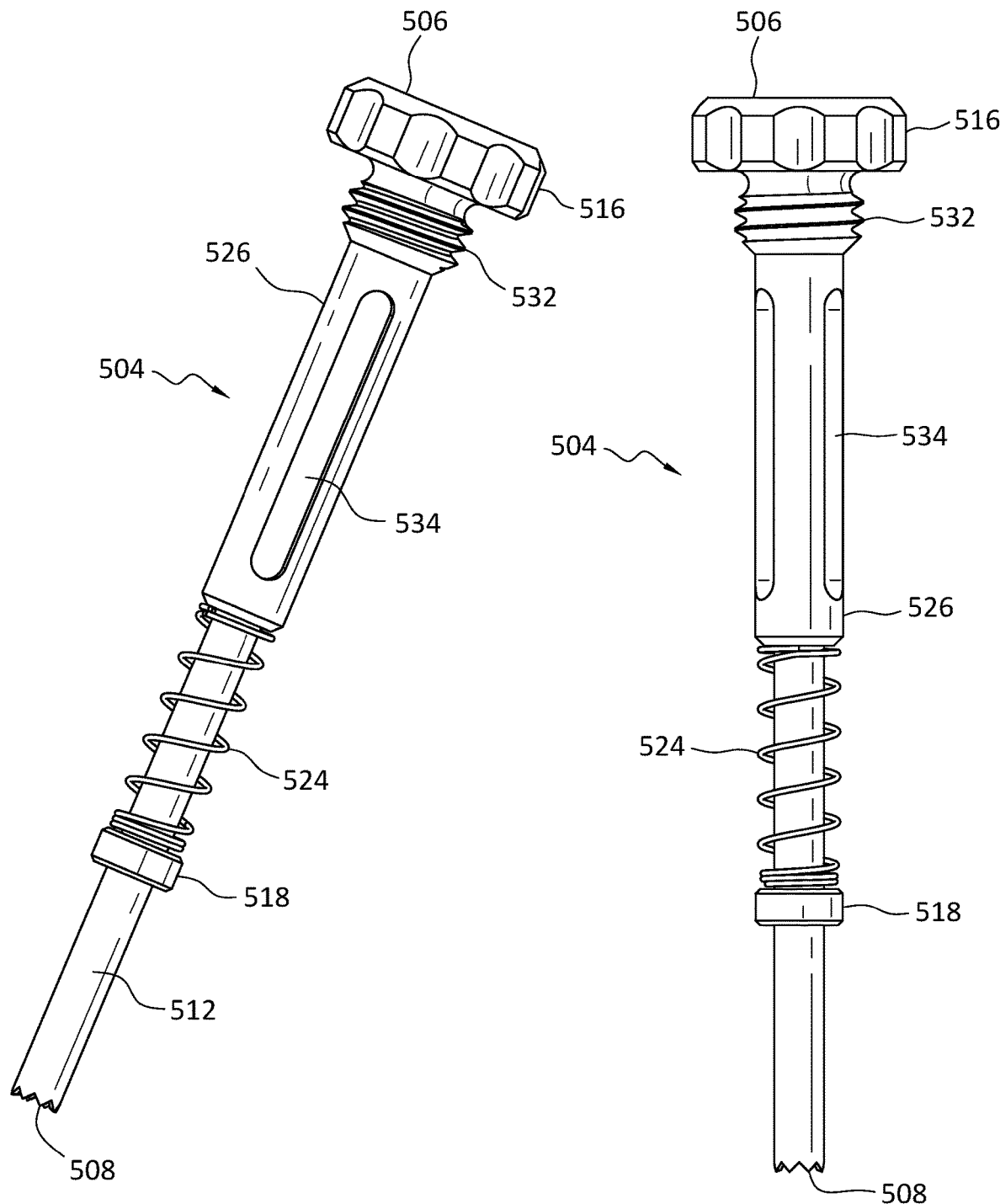
FIGS. 10A-10C illustrate perspective, side, and cross-sectional views of the drill guide.
Figure 10C:
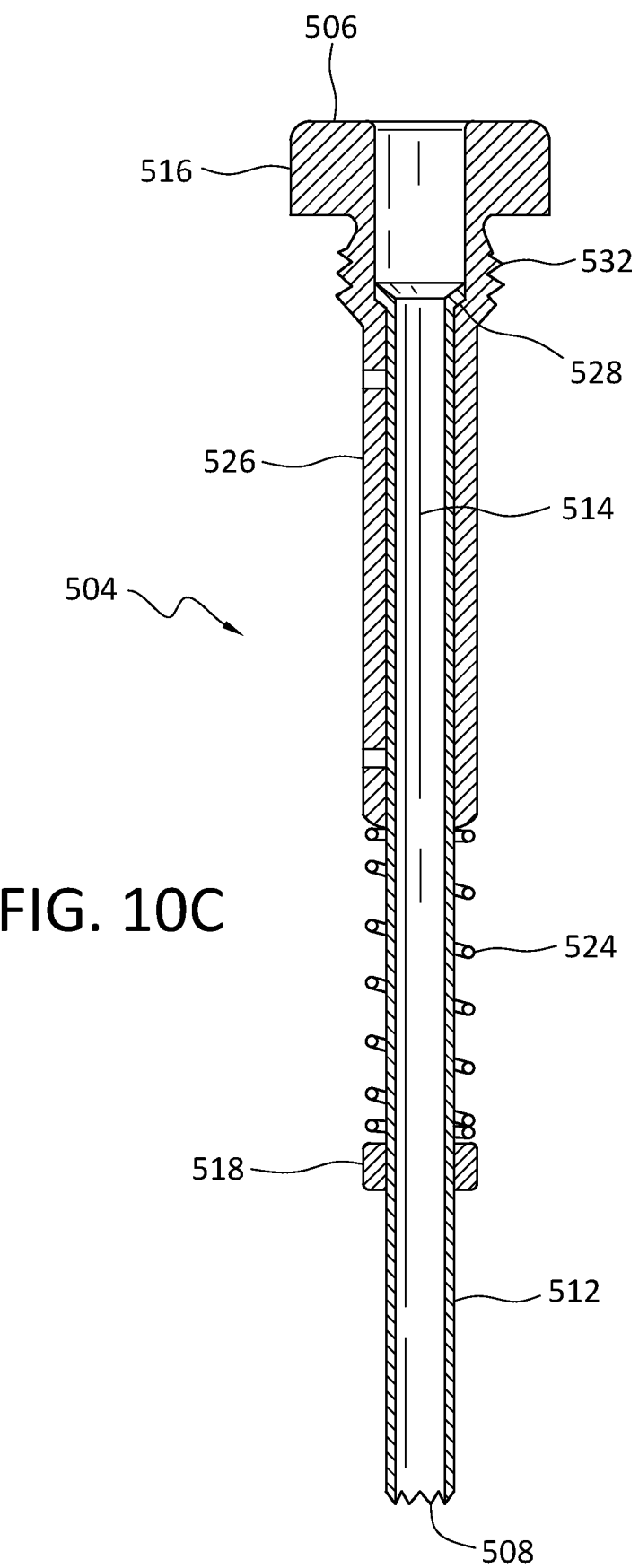

FIGS. 10A-10C illustrate perspective, side, and cross-sectional views of the drill guide 504. The drill guide 504 includes drill guide body 526, drill guide tube 512, spring 524, and ring 518. The drill guide tube 512 slides into the body opening 530 of drill guide body 526 where flared end 542 (see FIGS. 12A-12C) is captured by tube stop 528. The spring 524 may then be placed over the drill guide tube 512 and slide into contact with a distal end of the drill guide body 526. The ring 518 is then placed over the drill guide tube 512 and may be secured to drill guide tube 512, for example using spot welding or some other technique. As a result, spring 524 biases the ring 518 away from the distal end of drill guide body 526, and hence biases the drill guide tube 512 in a distal direction until the flared end 542 contacts tube stop 528. Then when the surgeon places the distal end 508 through the plate hole and against the bone, pressure may then be placed on the drill guide handle 502 to engage the sleeve distal end 522 with the plate hole to align the drill guide tube 512 with the plate hole. Then when the surgeon removes the drill guide assembly 500 from the plate hole the drill guide tube 512 is biased outward again. This construction allows for the drill guide 504 to be one piece that may be separated from the drill guide sleeve 520 and that may easily be cleaned.

FIGS. 11A-11C illustrate perspective, side, and cross-sectional views of the drill guide body. The drill guide body 526 includes a drill guide knob 516, body thread 532, and a tube portion 544. The drill guide knob 516 may include grip portions that allow for the drill guide body 526 to be attached to the drill guide sleeve 520. The body thread 532 interacts with sleeve internal thread 536 of drill guide sleeve 520 so that the drill guide body 526 may be screwed into the drill guide sleeve 520 to securely attach the drill guide body 526 to the drill guide sleeve 520. Other methods and structures may be used as well to connect drill guide body 526 to drill guide sleeve 520. The tube portion 544 extends from the drill guide body 526 and body thread 532 and fits in the drill passage guide 510 of the drill guide sleeve 520. The tube portion 544 may include body window 534 that may facilitate cleaning of the drill guide body 526. The tube portion 544 also include a body opening 530 that receives the drill guide tube 512. The body opening 530 may have a stepped shape with a first portion having a first diameter configured to receive the flared end 542 and a second portion having a second diameter smaller than the first diameter configured to receive the drill guide tube 512.

The distal end 508 of the drill guide tube 512 extends beyond the sleeve distal end 522 by a predetermined length. As the distal end 508 engages the bone, the drill guide tube 512 is pushed upward or proximally so that the flared end 542 moves in the first portion of body opening 530. The length of the first portion of body opening 530 may be selected to be long enough to prevent the flared end 542 from extending beyond the proximal end 506. This is beneficial as the proximal end 506 may be used as a reference surface to determine the distance to the bone surface.

As mentioned above, the drill guide body 526 includes tube stop 528 in the body opening 530 that engages the flared end 542 of the drill guide tube 512. The tube stop 528 limits the movement of drill guide tube 512 in the distal direction. The tube stop 528 is a frustoconical transition between the first and second portions of the body opening 530. In other embodiments the tube stop 528 may take other shapes, such as a step surface that is substantially perpendicular to a longitudinal axis of the body opening 530.

Figure 12A:
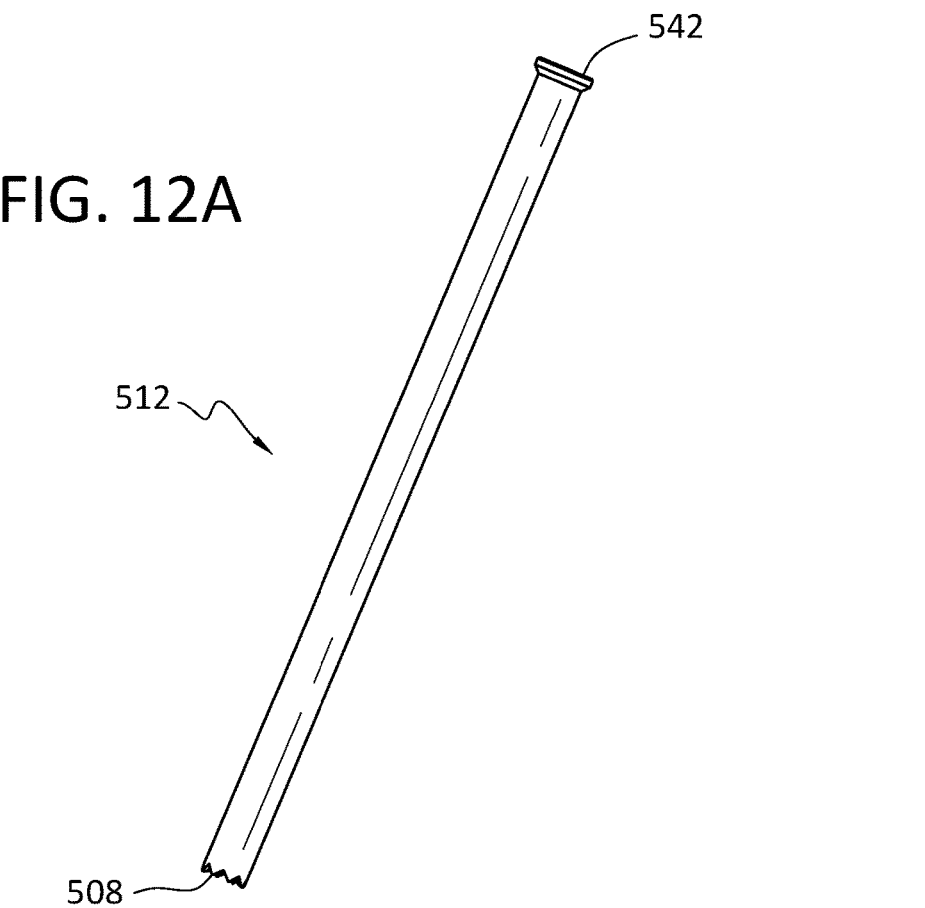
FIGS. 12A-12C illustrate perspective, side, and cross-sectional views of drill guide tube.
Figure 12B:
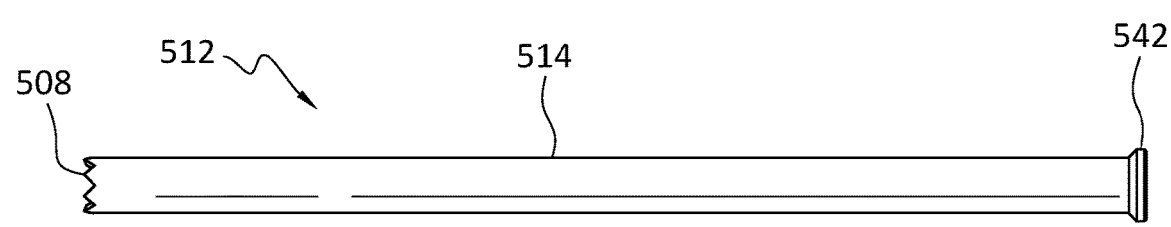
Figure 12C:
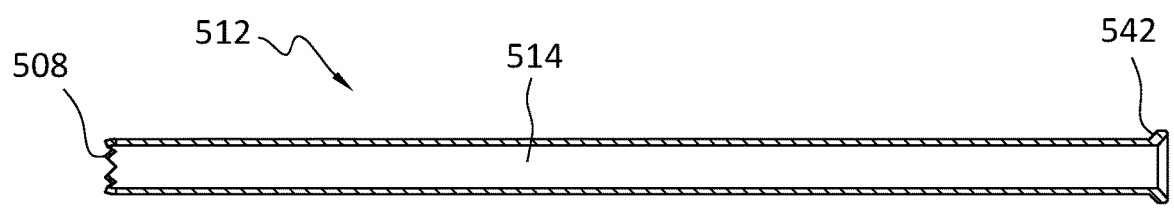

FIGS. 12A-12C illustrate perspective, side, and cross-sectional views of drill guide tube. The drill guide tube 512 is a generally cylindrical tube with flared end 542 at a proximal end. The flared end 542 limits the motion of the drill guide tube 512 inside the drill guide body 526 by engaging tube stop 528 of the drill guide body 526. The drill passage 514 of the drill guide tube 512 is sized to accommodate the drill bit to be used with the bone plate. The drill guide tube 512 includes distal end 508 that may have teeth that provide grip when the distal end 508 is placed against bone.

FIGS. 13A-13C illustrate perspective, side, and cross-sectional views of the drill guide sleeve. The drill guide sleeve 520 is a generally cylindrically shaped tube. The drill guide sleeve 520 includes drill passage guide 510 that is configured to accept drill guide 504. The drill passage guide 510 includes sleeve internal thread 536 configured to engage body thread 532 of the drill guide body 526. The drill passage guide 510 also includes a first portion with a first diameter configured to receive the tube portion 544 of the drill guide body 526. The drill passage guide 510 also includes a second portion with a second diameter configured to receive the drill guide tube 512. The drill passage guide 510 includes ring stop 538 that is in between the first and second portions of the drill passage guide 510. The ring stop 538 is a frustoconical transition between the first and second portions of the drill passage guide 510. In other embodiments the ring stop 538 may take other shapes, such as a step surface that is substantially perpendicular to a longitudinal axis of the drill passage guide 510.

The drill guide sleeve 520 may also include handle notch 540. The drill guide handle 502 may engage the handle notch 540. The outer diameter of the drill guide sleeve 520 may taper down to the sleeve distal end 522 as shown. The sleeve distal end 522 has a rounded shape that corresponds to the shape of the plate hole. The sleeve distal end 522 is shaped to align the drill guide 504 in the plate hole of the plate and facilitates the drilling of a neutral hole. Further, the rounded head may allow for drilling of an angled neutral hole as well.

The drill guide assembly 500 may be used in to drill neutral holes or offset holes. To drill a neutral hole, the surgeon first places the distal end 508 of the drill guide tube 512 that extends out of the drill guide body 526 in contact with the bone through the plate hole. The surgeon may then press the drill guide assembly 500 downward by applying a downward force on the drill guide handle 502 until the sleeve distal end 522 comes into contact with the plate hole. The sleeve distal end 522 acts to align the drill guide tube 512 in the plate hole. The surgeon may then change the angle of the drill guide assembly 500 if desired. Then the surgeon may then drill a hole with the drill guided by the drill guide assembly 500. To drill an offset hole, the surgeon places the distal end 508 in the desired location of the plate hole, and then without engaging the sleeve distal end 522 with the plate hole, drills the hole in the bone using the drill guide assembly 500.

Figure 14A:
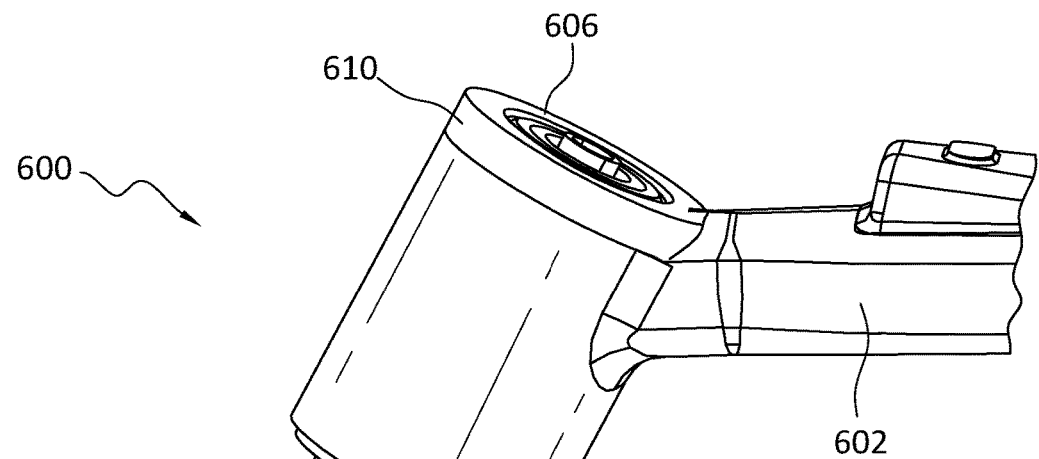
FIG. 14A illustrates another embodiment of a drill guide assembly.
Figure 14B:
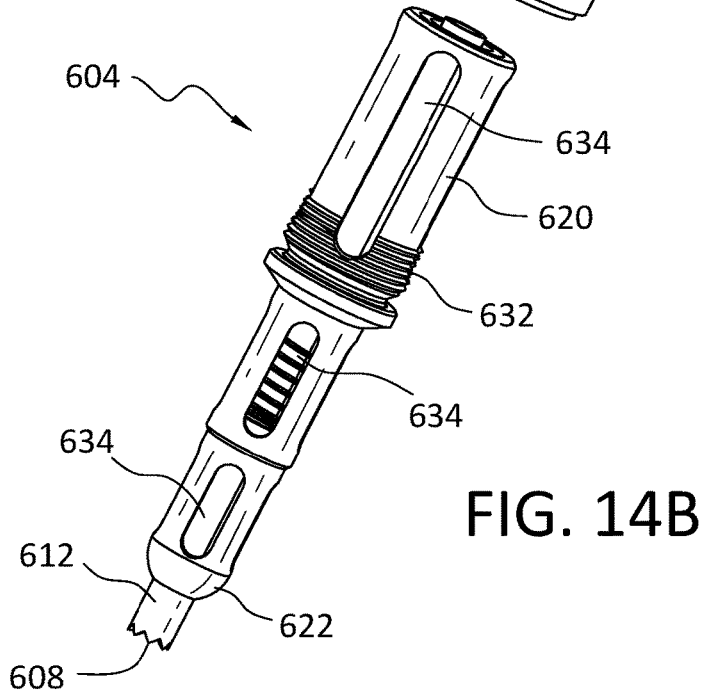
FIG. 14B illustrates the drill guide separated from the drill guide handle.

FIG. 14A illustrates another embodiment of a drill guide assembly. The drill guide assembly 600 is intended to cleaned without any disassembly of the drill guide 604. FIG. 14B illustrates the drill guide 604 separated from the drill guide handle 602. The drill guide 604 includes drill guide sleeve 620, spring 624, and drill guide tube 612. The drill guide assembly 600 functions in the same manner as the drill guide assembly 500. The spring 624 biases the drill guide tube 612 towards the drill guide tube 612. The spring engages a ring (not shown here) on drill guide tube 612 as before and the interior of the drill guide sleeve 620 to bias the drill guide tube 612. The drill guide sleeve 620 includes sleeve distal end 622 to interface with the plate hole as previously described.

The drill guide sleeve 620 includes sleeve windows 634 to facilitate cleaning of the drill guide assembly 600. The drill guide assembly 600 of FIGS. 14A and 14B include nine sleeve windows 634 in three groups of three windows. Each group of three windows are spread around the circumference of the drill guide sleeve 620. The three groups of windows are shown as being aligned, but they may not be aligned in other embodiments. Also each group of windows may include more or fewer windows. The three groups of windows are spread across the length of the drill guide sleeve 620. One group is near the sleeve distal end 622. A second group is adjacent the spring 624 to facilitate cleaning of the spring. The last group is adjacent the proximal end 606 of the drill guide sleeve 620.

Figure 15:
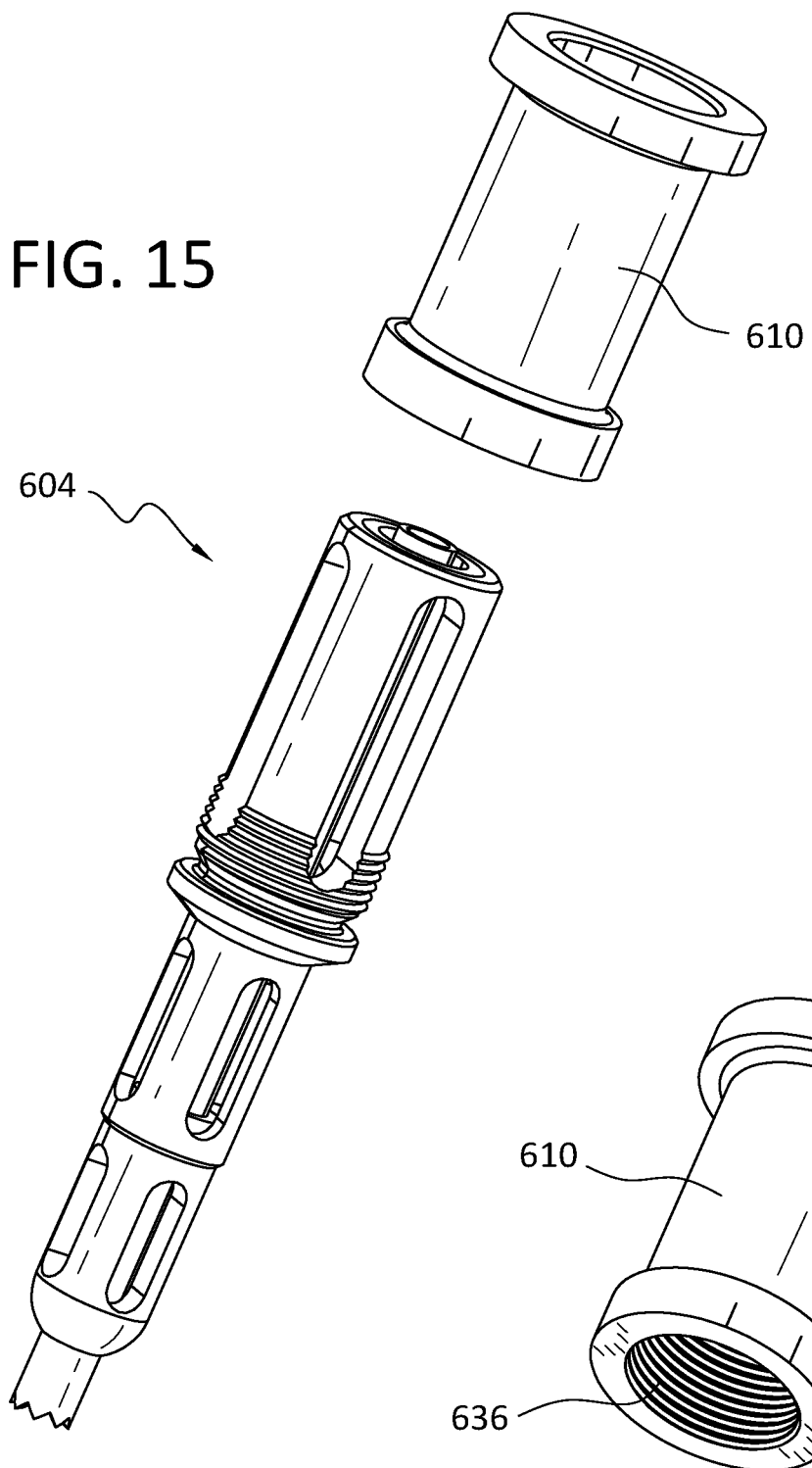
FIG. 15 illustrates a handle interface and the drill guide.
Figure 16:
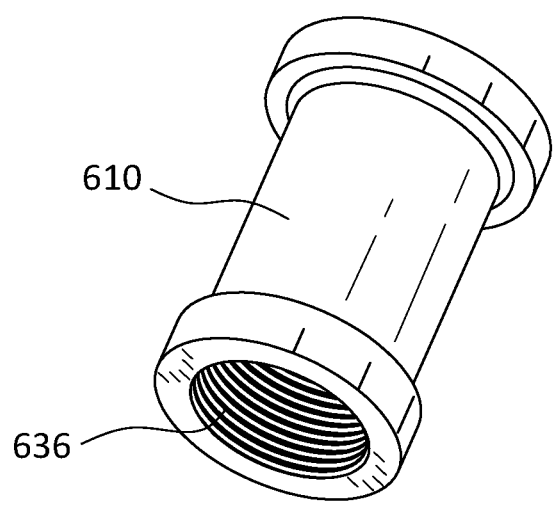
FIG. 16 illustrates a perspective view of handle interface.

FIG. 15 illustrates a handle interface 610 and the drill guide 604. FIG. 16 illustrates a perspective view of handle interface 610. An upper section of the drill guide sleeve 620 is inserted inside the handle interface 610. In this case the sleeve thread 632 may be used to screw the drill guide 604 into the handle interface 610 which has internal thread 636. The drill guide 604 may be attached to handle interface 610 or the drill guide handle 602 using other methods. For example, drill guide 604 may be press fitted into handle interface 610 or may be welded or glued to handle interface 610. In other embodiments, the handle interface 610 may not be present, and the drill guide 604 may directly interface with drill guide handle 602. The handle drill guide handle 602 of FIGS. 14A and 14B may be molded around handle interface 610 or attach in any other manner.

The drill guide tube 612 and the drill guide sleeve 620 may be sized such that there is a gap between them when the drill guide assembly 600 is assembled. These gaps along with the sleeve windows 634 of the upper section of drill guide 604 allow for the upper section of drill guide 604 to be cleaned without disassembly of the drill guide 604. The other sleeve windows 634 also facilitate cleaning of different drill guides 604.

Another aspect of the drill guide assembly 600 is that a single drill guide handle 602 may be used with different drill guides 604 that could be screwed onto the drill guide handle 602. Hence, only one handle is needed, and multiple drill guides 604 of different sizes could be used with that handle.

Figure 17A:
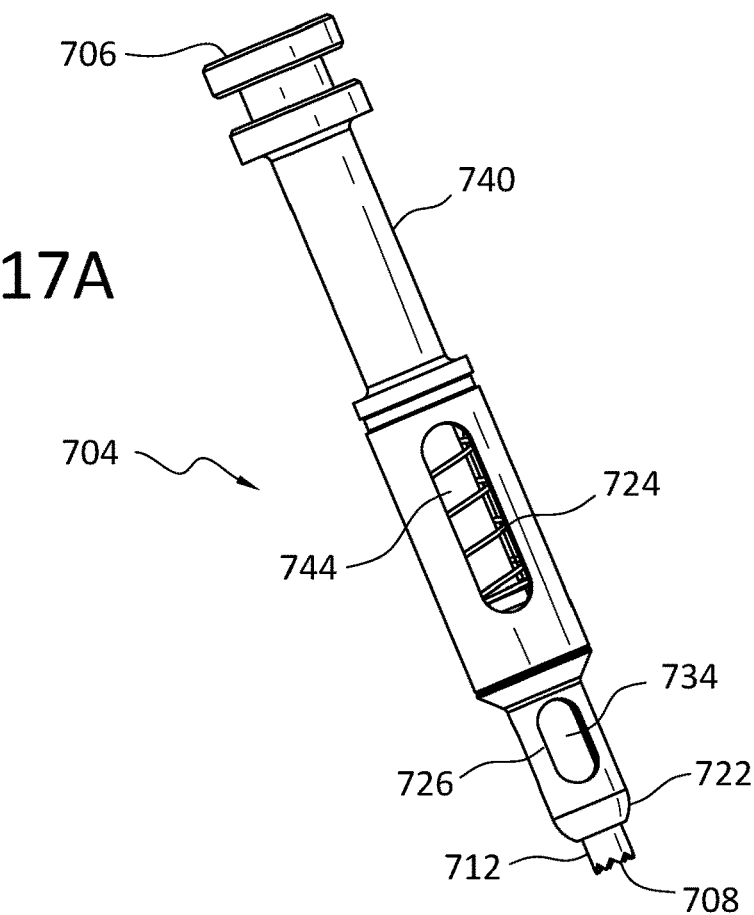
FIGS. 17A-17C illustrate perspective, side, and cross-sectional views of the drill guide.
Figure 17B:
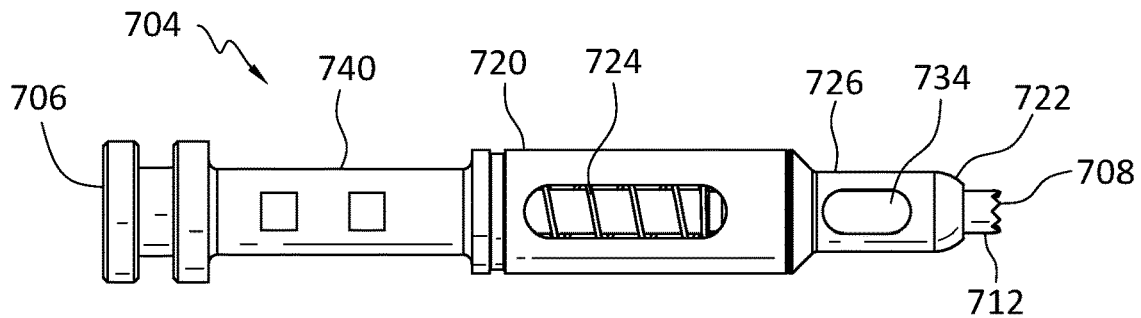
Figure 17C:
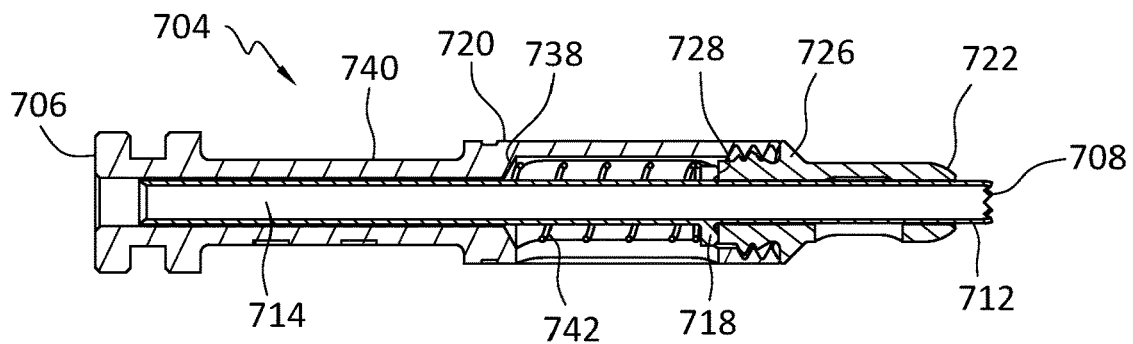

FIGS. 17A-17C illustrate perspective, side, and cross-sectional views of the drill guide 704. The drill guide 704 may have a proximal end 706 and a distal end 708 with a drill guide passage 710 (see FIG. 19C) that extends between the proximal end 706 and distal end 708. The drill guide tube 712 includes drill passage 714 that guides the drill bit used to drill a hole in the bone. The distal end 708 of the drill guide tube 712 extends beyond a nose distal end 722 of the drill guide sleeve 720. The nose distal end 722 may be rounded as described above in order to engage a plate hole and to align the drill guide 704 in the plate hole. The drill guide 704 may include a spring 724 that biases the drill guide tube 712 towards the distal end 708 so that the distal end 708 extends beyond the nose distal end 722. Then a surgeon places the drill guide 704 in a plate hole so that the distal end 708 engages the bone, and then the surgeon may apply a downward force on the drill guide handle 702 until the nose distal end 722 engages the plate hole. This engagement will cause the nose distal end 722 of the drill guide tube 712 to be aligned in the plate hole and the plate hole and the bone plate are shielded from the drill bit to prevent damage to the bone plate because of the drill guide tube 712.

Figure 19A:
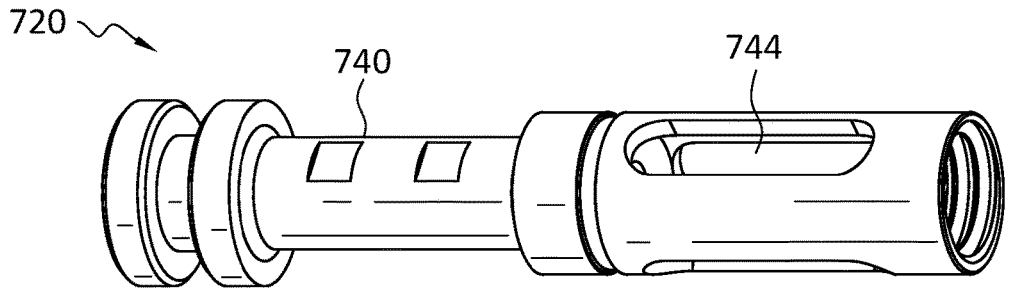
FIGS. 19A-19C illustrate perspective, side, and cross-sectional views of the drill guide sleeve.
Figure 19B:
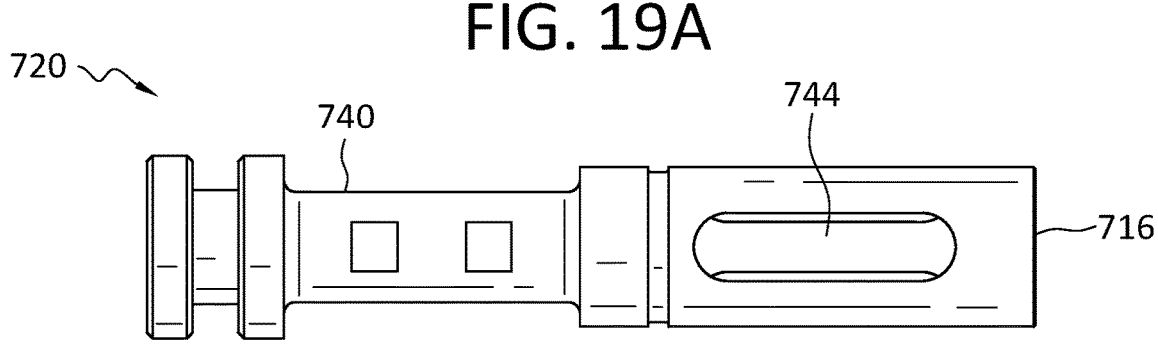
Figure 19C:
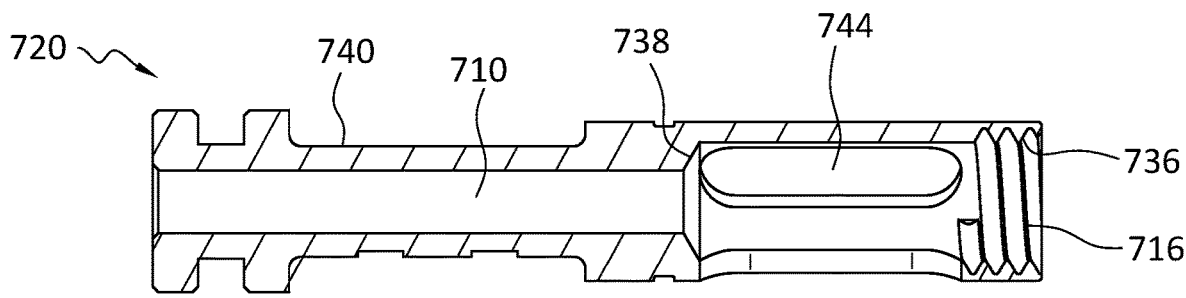

The drill guide 704 includes drill guide tube 712, spring 724, and nose 726. The spring 724 may be placed in the drill guide sleeve 720 via sleeve opening 716 (FIGS. 19A-19C). A proximal end of the drill guide tube 712 slides into sleeve opening 716 of drill guide sleeve 720 and the spring 724. Then the nose 726 is slid over the distal end 708 of the drill guide tube 712 and screwed into the drill guide sleeve 720 using sleeve internal thread 736 and nose thread 732. A tube stop 728 (see FIGS. 20A-20C) engages ring 718 on the drill guide tube 712. As a result, spring 724 biases the ring 718 away from the distal end of nose 726, and hence biases the drill guide tube 712 in a distal direction until the ring 718 contacts a tube stop 728. Then when the surgeon places the distal end 708 through the plate hole and against the bone, pressure may then be placed on the drill guide handle (not shown) to engage the nose distal end 722 with the plate hole to align the drill guide tube 712 with the plate hole. Then when the surgeon removes the drill guide 704 from the plate hole the drill guide tube 712 is biased outward again.

Figure 18A:
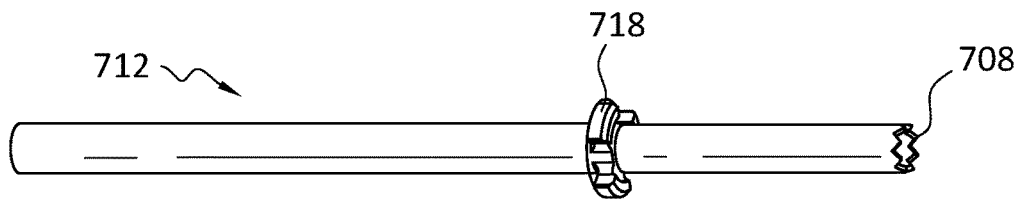
FIGS. 18A and 18B illustrate perspective and side views of drill guide tube.
Figure 18B:
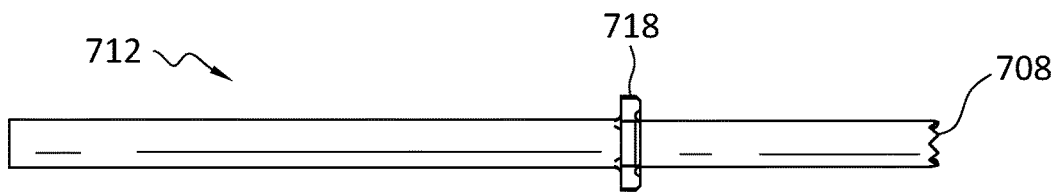

FIGS. 18A and 18B illustrate perspective and side views of drill guide tube. The drill guide tube 712 is a generally cylindrical tube with ring 718. The ring 718 limits the motion of the drill guide tube 712 inside the drill guide sleeve 720 by engaging tube stop 728 of the nose 726. The ring 718 is show as a segmented ring in FIG. 18A, but may be a continuous ring like in the embodiments described above. The ring may be manufactured separately from the drill guide tube 712 and attached to drill guide tube 712 using any method, for example welding or adhesive. The drill passage 714 of the drill guide tube 712 is sized to accommodate the drill bit to be used with the bone plate. The drill guide tube 712 includes distal end 708 that may have teeth that provide grip when the distal end 708 is placed against bone.

FIGS. 19A-19C illustrate perspective, side, and cross-sectional views of the drill guide sleeve. The drill guide sleeve 720 is a generally cylindrically shaped tube. The drill guide sleeve 720 includes drill passage guide 710 that is configured to accept the spring 724 and drill guide tube 712. The drill passage guide 710 includes sleeve internal thread 736 configured to engage nose thread 732 (see FIGS. 20A-20C) of the nose 726. The drill passage guide 710 also includes a first portion with a first diameter configured to receive the ring 718 of the drill guide tube 712. The drill passage guide 710 also includes a second portion with a second diameter configured to receive the drill guide tube 712. The drill passage guide 710 includes spring stop 738 that is in between the first and second portions of the drill passage guide 710. The spring stop 738 is a frustoconical transition between the first and second portions of the drill passage guide 710. In other embodiments the spring stop 738 may take other shapes, such as a step surface that is substantially perpendicular to a longitudinal axis of the drill passage guide 710. The drill guide sleeve 720 may also include handle notch 740. The drill guide handle may engage the handle notch 740. The drill guide sleeve 720 includes drill guide sleeve windows 744. The drill guide sleeve windows 744 facilitated the cleaning of the drill guide 704.

Figure 20A:
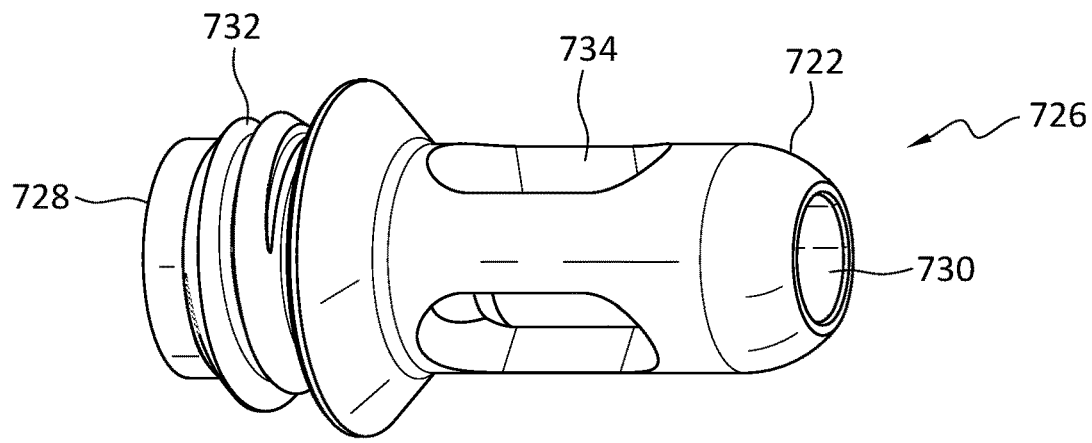
FIGS. 20A-20C illustrate perspective, side, and cross-sectional views of the nose.
Figure 20B:
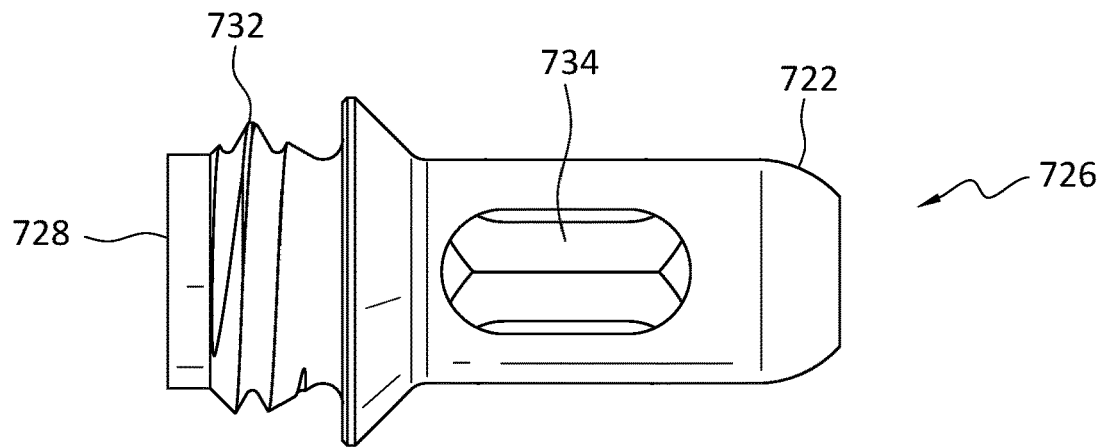
Figure 20C:
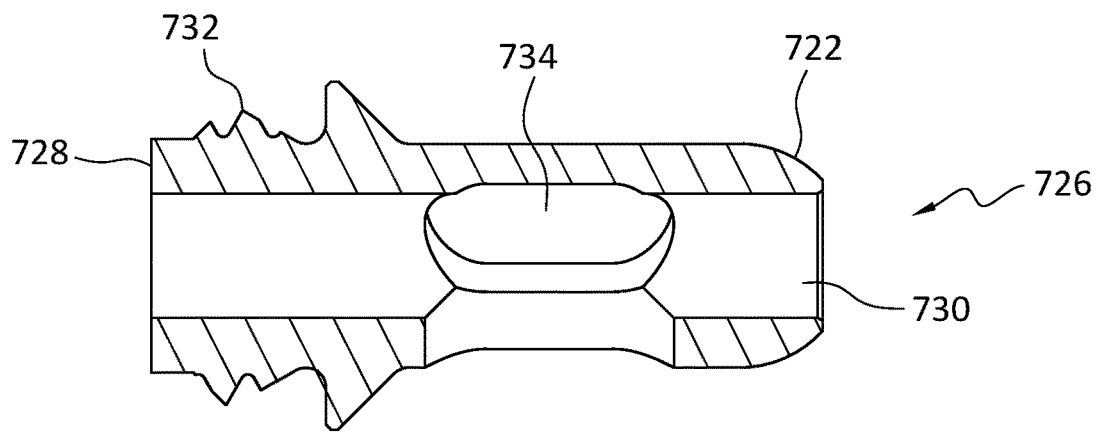

FIGS. 20A-20C illustrate perspective, side, and cross-sectional views of the nose. The nose 726 includes nose thread 732, tube stop 728, nose window 734, nose opening 730, and nose distal end 722. The nose thread 732 interacts with sleeve internal thread 736 of drill guide sleeve 720 so that the nose 726 may be screwed into the drill guide sleeve 720 to securely attach the nose 726 to the drill guide sleeve 720. Other methods of attaching the nose 726 to the drill guide sleeve 720 may also be used. The nose 726 may be securely attached to the drill guide sleeve 720 using various methods such as welding, adhesive, etc. This prevents the drill guide 704 from being disassembled, but drill guide 704 has sufficient windows and other features to allow for drill guide 704 to be cleaned without disassembly. This means that the drill guide 704 may be cleaned without disassembly to prevent the loss or damage of parts of the drill guide 704.

The nose 726 may include nose window 734 that may facilitate cleaning of drill guide 704. The nose 726 also includes a nose opening 730 that receives the drill guide tube 712. As mentioned above, the nose 726 includes tube stop 728 at the end of nose thread 732 that engages the ring 718 of the drill guide tube 712. The tube stop 728 limits the movement of drill guide tube 712 in the distal direction. The outer diameter of the nose 726 may taper down to the nose distal end 722 as shown. The nose distal end 722 has a rounded shape that corresponds to the shape of the plate hole. The nose distal end 722 is shaped to align the drill guide 704 in the plate hole of the plate and facilitates the drilling of a neutral hole. Further, the rounded head may allow for drilling of an angled neutral hole as well.

A drill guide assembly using drill guide 704 may be used in to drill neutral holes or offset holes. To drill a neutral hole, the surgeon first places the distal end 708 of the drill guide tube 712 that extends out of the nose 726 in contact with the bone through the plate hole. The surgeon may then press the drill guide assembly downward by applying a downward force on the drill guide handle until the nose distal end 722 comes into contact with the plate hole. The nose distal end 722 acts to align the drill guide tube 712 in the plate hole. The surgeon may then change the angle of the drill guide assembly if desired. Then the surgeon may then drill a hole with the drill guided by the drill guide assembly. To drill an offset hole, the surgeon places the distal end 708 in the desired location of the plate hole, and then without engaging the nose distal end 722 with the plate hole, drills the hole in the bone using the drill guide assembly.

Various embodiments off drill guide sleeves have been described. These drill guide sleeves allow a surgeon to drill offset holes for compression places. Further, the allow the surgeon to drill neutral holes or angled neutral holes while protecting the bone plate from the drill bit.

While each of the embodiments are described above in terms of their structural arrangements, it should be appreciated that the invention also covers the associated methods of using the embodiments described above.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications and combinations of the various embodiments can be affected while remaining within the spirit and scope of the invention. Accordingly, the foregoing disclosure, description, and figures are for illustrative purposes only and do not in any way limit the invention, which is defined only by the claims.

What is claimed is:

1. A drill guide assembly configured to engage a drill bit, comprising:
   a drill guide including:
      a drill guide tube including a ring and a flared end at a proximal end of the drill guide tube;
      a drill guide body with a central opening configured to receive the drill guide tube and a tube stop configured to engage the flared end; and
      a spring configured to engage the ring and distal end of the drill guide body; and
   a drill guide sleeve with a central opening configured to receive the drill guide including a ring stop configured to engage the ring and a sleeve distal end configured to engage a plate hole on a bone plate,
   wherein the spring is configured to bias the drill guide tube in a distal direction so that a distal end of the drill guide tube extends from the sleeve distal end.

2. The drill guide assembly of claim 1, wherein drill guide body includes external threads and the drill guide sleeve includes internal threads configured to engage the external threads to securely fasten the drill guide body to the drill guide sleeve.

3. The drill guide assembly of claim 2, wherein drill guide body includes a knob at a proximal end to facilitate rotating the drill guide body to engage the external threads with the internal threads.

4. The drill guide assembly of claim 1, wherein the drill guide body includes a tube portion with a body window configured to facilitate cleaning of the drill guide body.

5. The drill guide assembly of claim 1, wherein the sleeve distal end is rounded and configured to align the drill guide tube in the plate hole.

6. The drill guide assembly of claim 1, wherein a distal end of the drill guide tube has teeth.

7. The drill guide assembly of claim 1, further comprising a handle configured to attach to the drill guide sleeve.

8. The drill guide assembly of claim 1, wherein the drill guide is a single removable unit that facilitates cleaning.

9. A method of drilling a hole in a bone through a plate hole in a bone plate using the drill guide assembly of claim 1, comprising:
   placing a distal end of the drill guide tube in contact with the bone through the plate hole;
   applying a downward force on the drill guide sleeve until the sleeve distal end engages the plate hole and aligns the drill guide tube with the plate hole; and
   drilling a hole in the bone by placing the drill bit in the drill guide tube.

10. The method of claim 9, further comprising moving the drill guide sleeve to a desired drilling angle after applying the downward force.

11. A method of drilling a hole in a bone through a plate hole in a bone plate using the drill guide assemble of claim 1, comprising:
   placing a distal end of the drill guide tube in contact with the bone through the plate hole in an offset position; and
   drilling the hole in the bone by placing the drill bit in the drill guide tube so that the sleeve distal end does not engage the plate hole.

12. A drill guide assembly configured to engage a drill bit, comprising:
   a drill guide tube including a ring;
   a spring;
   a drill guide sleeve with a central opening configured to receive the drill guide tube and the spring and a spring stop;
   a nose configured to connect to the drill guide sleeve, wherein the nose has a central opening configured to receive the drill guide tube and a nose distal end configured to engage a plate hole on a bone plate; and configured to engage the ring and spring stop,
   wherein the spring is configured to engage the ring and spring stop and to bias the drill guide tube in a distal direction so that a distal end of the drill guide tube extends from the nose distal end.

13. The drill guide assembly of claim 12, wherein the nose includes external threads and the drill guide sleeve includes internal threads configured to engage the external threads to securely fasten the nose to the drill guide sleeve.

14. The drill guide assembly of claim 12, wherein a proximal end of the nose is a ring stop configured to limit a distal movement of the ring.

15. The drill guide assembly of claim 12, wherein the nose includes a nose window and the drill guide sleeve includes a sleeve window configured to facilitate cleaning of the nose and the drill guide sleeve.

16. The drill guide assembly of claim 12, wherein the nose distal end is rounded and configured to align the drill guide tube in the plate hole.

17. The drill guide assembly of claim 12, wherein a distal end of the drill guide tube has teeth.

18. The drill guide assembly of claim 12, further comprising a handle configured to attach to the drill guide sleeve.

19. A method of drilling a hole in a bone through a plate hole in a bone plate using the drill guide assembly of claim 12, comprising:
   placing a distal end of the drill guide tube in contact with the bone through the plate hole;
   applying a downward force on the drill guide sleeve until the nose distal end engages the plate hole and aligns the drill guide tube with the plate hole; and
   drilling a hole in the bone by placing a drill bit in the drill guide tube.

20. The method of claim 19, further comprising moving the drill guide sleeve to a desired drilling angle after applying the downward force.

21. A method of drilling a hole in a bone through a plate hole in a bone plate using the drill guide assemble of claim 12, comprising:
   placing a distal end of the drill guide tube in contact with the bone through the plate hole in an offset position; and
   drilling a hole in the bone by placing a drill bit in the drill guide tube so that the nose distal end does not engage the plate hole.

* * * * *